(12) United States Patent
Dudar

(10) Patent No.: US 10,513,997 B2
(45) Date of Patent: Dec. 24, 2019

(54) METHODS AND SYSTEMS FOR INTAKE AIR FILTER DIAGNOSTICS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 15/840,370

(22) Filed: Dec. 13, 2017

(65) Prior Publication Data

US 2019/0178190 A1 Jun. 13, 2019

(51) Int. Cl.
*F02D 41/22* (2006.01)
*B60K 6/20* (2007.10)
(Continued)

(52) U.S. Cl.
CPC ............. *F02D 41/22* (2013.01); *B60K 6/20* (2013.01); *B60W 20/50* (2013.01); *F01N 11/002* (2013.01); *F02D 41/0007* (2013.01); *F02D 41/0037* (2013.01); *F02D 41/1448* (2013.01); *F02D 41/18* (2013.01); *F02M 25/0836* (2013.01); *F02M 35/024* (2013.01); *F02M 35/1038* (2013.01); *B60W 2510/0628* (2013.01);
(Continued)

(58) Field of Classification Search
CPC .. F02D 41/22; F02D 41/0007; F02D 41/0037; F02D 41/1448; F02D 41/18; F02D 41/26; F02D 2200/0402; F02D 2200/0406; F02D 2200/101; B60K 6/20; B60W 20/50; B60W 2510/0628; B60W 2510/0642; B60W 2710/0633; B60W 2710/08; F02M 25/0836; F02M 35/024; F02M 35/1038; F02M 25/0854; F02M 35/104; F01N 11/002; F01N 3/021; F01N 2560/08; Y10S 903/903

See application file for complete search history.

(56) References Cited

U.S. PATENT DOCUMENTS 7,444,234 B2 * 10/2008 Bauerle ................. F02M 35/09
  123/361
8,343,288 B2 1/2013 Murakami et al.
(Continued)

OTHER PUBLICATIONS

"New Mustang GT Owners Can Now Hush the V8 Growl to be Good Neighbors; Brush with the Law Gave Engineer the Idea," At Ford Online, Available Online at www.at.ford.com/en/homepage/news-and-clipsheet/news/2017/8/mustanghush.html, Aug. 1, 2017, 3 pages.

(Continued)

*Primary Examiner* — Calvin Cheung
(74) *Attorney, Agent, or Firm* — Geoffrey Brumbaugh; McCoy Russell LLP

(57) ABSTRACT

Methods and systems are provided for diagnostics of an intake air filter during vehicle-off conditions. In one example, the engine may be reverse rotated, unfueled, and air flow via the exhaust manifold and the intake manifold are estimated and compared to a baseline air flow. A blocked intake air flow may be indicated based on the comparison between air flow via the exhaust manifold and the intake manifold and the baseline air flow upon opening a secondary flow path to atmosphere.

20 Claims, 9 Drawing Sheets

(51) Int. Cl.
*B60W 20/50* (2016.01)
*F01N 11/00* (2006.01)
*F02M 25/08* (2006.01)
*F02M 35/024* (2006.01)
*F02M 35/10* (2006.01)
*F02D 41/14* (2006.01)
*F02D 41/18* (2006.01)
*F02D 41/00* (2006.01)
*F01N 3/021* (2006.01)
*F02D 41/26* (2006.01)
*F02M 35/104* (2006.01)

(52) U.S. Cl.
CPC ............... *B60W 2510/0642* (2013.01); *B60W 2710/0633* (2013.01); *B60W 2710/08* (2013.01); *F01N 3/021* (2013.01); *F01N 2560/08* (2013.01); *F02D 41/26* (2013.01); *F02D 2200/0402* (2013.01); *F02D 2200/0406* (2013.01); *F02D 2200/101* (2013.01); *F02M 25/0854* (2013.01); *F02M 35/104* (2013.01); *Y10S 903/903* (2013.01)

(56) References Cited

U.S. PATENT DOCUMENTS

| | | | |
|---|---|---|---|
| 8,573,040 B2* | 11/2013 | Guzman | F02M 35/024 73/114.31 |
| 10,100,790 B1* | 10/2018 | Xiao | F02M 35/09 |
| 2005/0240338 A1* | 10/2005 | Ardisana | F02D 41/18 701/114 |
| 2011/0185895 A1 | 8/2011 | Freen | |
| 2011/0313615 A1 | 12/2011 | Bligard et al. | |
| 2014/0081550 A1* | 3/2014 | Jentz | F01M 1/18 701/101 |
| 2014/0196527 A1* | 7/2014 | Bossmeyer | F02D 21/08 73/114.74 |
| 2016/0245206 A1* | 8/2016 | Suzuki | F02N 11/0844 |

OTHER PUBLICATIONS

Dudar, A., "Methods and Systems for Exhaust Tuning Valve Diagnostics," U.S. Appl. No. 15/840,298, filed Dec. 13, 2017, 75 pages.

* cited by examiner

METHODS AND SYSTEMS FOR INTAKE AIR FILTER DIAGNOSTICS

FIELD

The present description relates generally to methods and systems for diagnostics of an intake air filter during vehicle-off conditions.

BACKGROUND/SUMMARY

Air filters positioned within or as part of an air intake system for an engine provide filtered air for the engine. Air filters can extract dust, dirt, and other air borne materials from an engine's air intake system so that air borne material does not collect in the engine and degrade engine performance and operation. However, air borne material can collect within the air filter over time such that the air filter restricts air flow into the engine. The air flow restriction from the air filter can increase engine pumping work and reduce vehicle fuel economy. In order to replace or clean the clogged air filter, a status of the air filter may be regularly diagnosed, and indicated to the operator.

Various approaches are provided for carrying out diagnostics of the intake air filter. In one example approach, as shown in U.S. Patent Application Publication No. 20110185895, Freen et al. shows a diagnostic method for an intake air filter to be carried out using a pressure sensing module including a battery powered pressure sensing probe coupled across the intake air filter. The pressure sensing probe measures a pressure differential between a first location, upstream of the air filter, and a second location, downstream of the air filter. Filter condition is then determined by comparing the pressure differential to a predetermined baseline pressure differential.

However, the inventors herein have recognized potential disadvantages with the above approach. As one example, in the system described by Freen, a battery powered probe is used to measure the pressure differential across the air filter which is generally not present around the air filter in naturally aspired engines. The additional probe may add complexity and cost to the engine system. Also, operation of the battery operated sensor may increase the parasitic loss of engine power due to the energy required to recharge the battery. Further, since re-calibration of the baseline pressure differential is to be carried out by a user whenever a new filter is installed, if the re-calibration is not timely performed, the described method may lead to incorrect estimation of filter condition. The air filter diagnosis depends on the engine being operational and intake air flowing into the engine. In a hybrid vehicle, however, the engine may operate for shorter durations. Thus, the air filter diagnostic may not be performed regularly causing the vehicle to operate with a clogged or blocked air filter for extended periods of time.

The inventors herein have recognized that the issues described above may be addressed by an engine method comprising: during unfueled cranking of an engine while the engine is spun in reverse, indicating a blocked intake air filter based on air flow through an exhaust system relative to air flow through an intake system and further based on a change in the air flow through the exhaust system upon opening a secondary path to atmosphere. In this way, by opportunistically spinning the engine in reverse direction during a vehicle key-off condition and monitoring air flow through the exhaust manifold and intake manifold, a blocked intake air filter may be diagnosed.

As one example, diagnostic routine of the intake air filter may be opportunistically carried out during vehicle key-off conditions when the engine is not operated and the vehicle is unoccupied. The diagnostic routine includes rotating the engine in a reverse direction via an electric machine and also spinning a battery operated electric booster coupled to the intake manifold in a reverse direction to draw in ambient air from the tailpipe and route the air to the intake manifold. Air flow through the exhaust passage is estimated via a differential pressure sensor coupled across a particulate filter and air flow through the intake passage is estimated via a manifold air flow (MAF) sensor. The exhaust air flow and the intake air flow may be compared to each other and then further compared to a baseline air flow. Upon installation of the intake air filter, the baseline air flow may be obtained by reverse rotating the engine and estimating air flow through the intake manifold via the MAF sensor. If it is determined that the intake air flow is substantially equal to each of the exhaust air flow and the baseline air flow, it may be indicated that the intake air filter is not blocked. If it is determined that the exhaust air flow is substantially equal to the intake air flow but is lower than the baseline air flow, a canister purge valve (CPV) and a canister vent valve (CVV) coupled to a canister purge line of an evaporative emissions control (EVAP) system may be opened to enable an alternate route for fluidic communication between the engine system and atmosphere. Upon opening of the CPV and the CVV, air entering through the exhaust manifold may be released to the atmosphere through the canister purge line without flowing through the portion of the intake passage housing the MAF sensor and the intake air filter. Therefore, if it is observed that the exhaust air flow increases to the baseline air flow without as significant change in the intake air flow, it may be inferred that the intake air filter is blocked and a diagnostic code may be set.

In this way, diagnostics of the intake air filter may be opportunistically carried out using components already existing in the engine system, thereby providing cost benefits. The technical effect of detecting a blockage in the intake air filter is that a desired air-fuel ratio may be maintained and combustion of richer than stoichiometric air-fuel mixture may be reduced. By maintaining the desired air-fuel ratio, fouling of spark plugs may be reduced and desired ignition timings may be maintained. Overall, by regularly monitoring the health of the intake air filter, degradation of the air filter may be detected in a timely manner and replacement of the blocked intake air filter may result in increased vehicle fuel economy and emissions quality.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
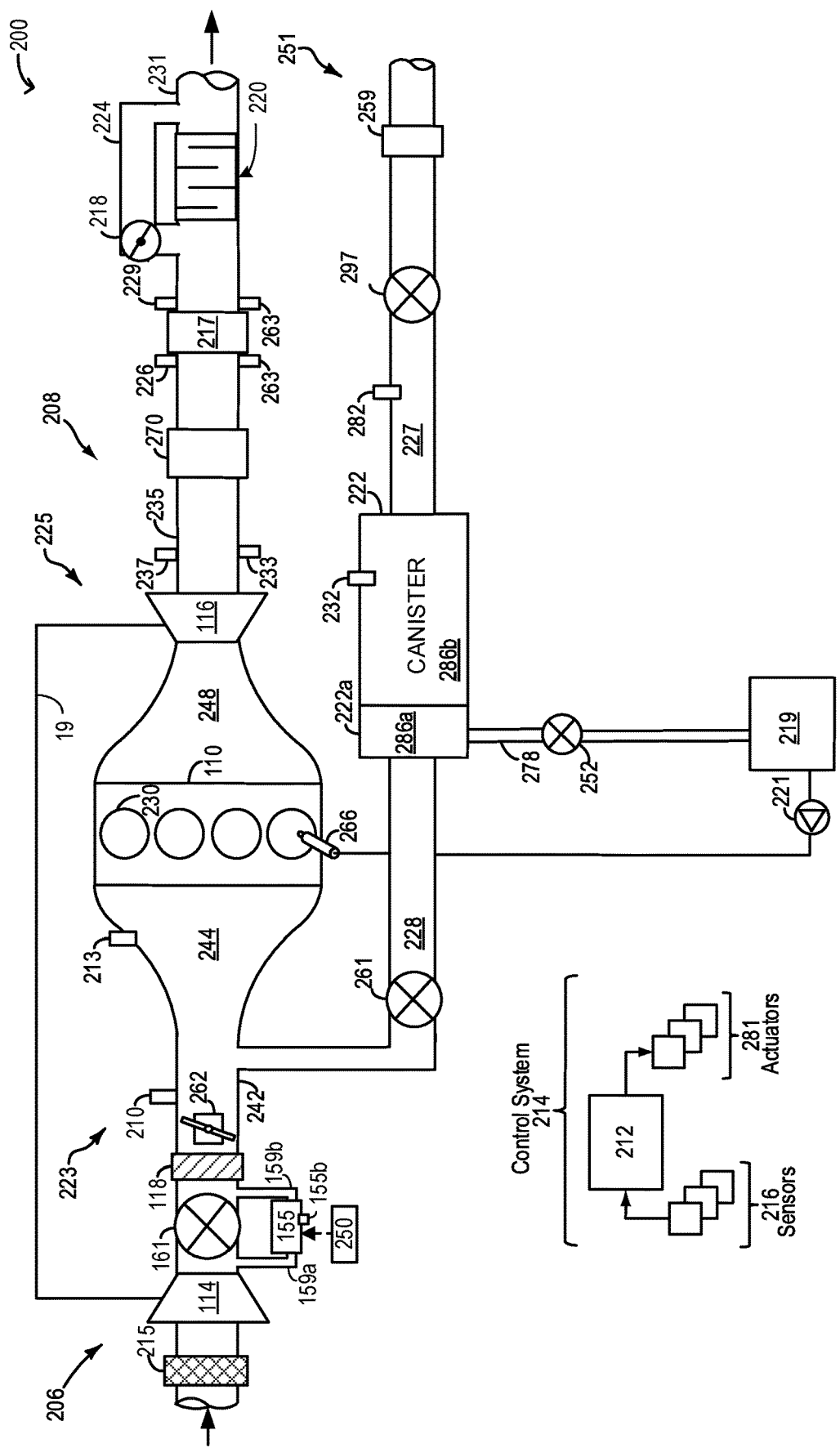
FIG. 2 schematically shows an example vehicle system with an electric booster.
Figure 3:
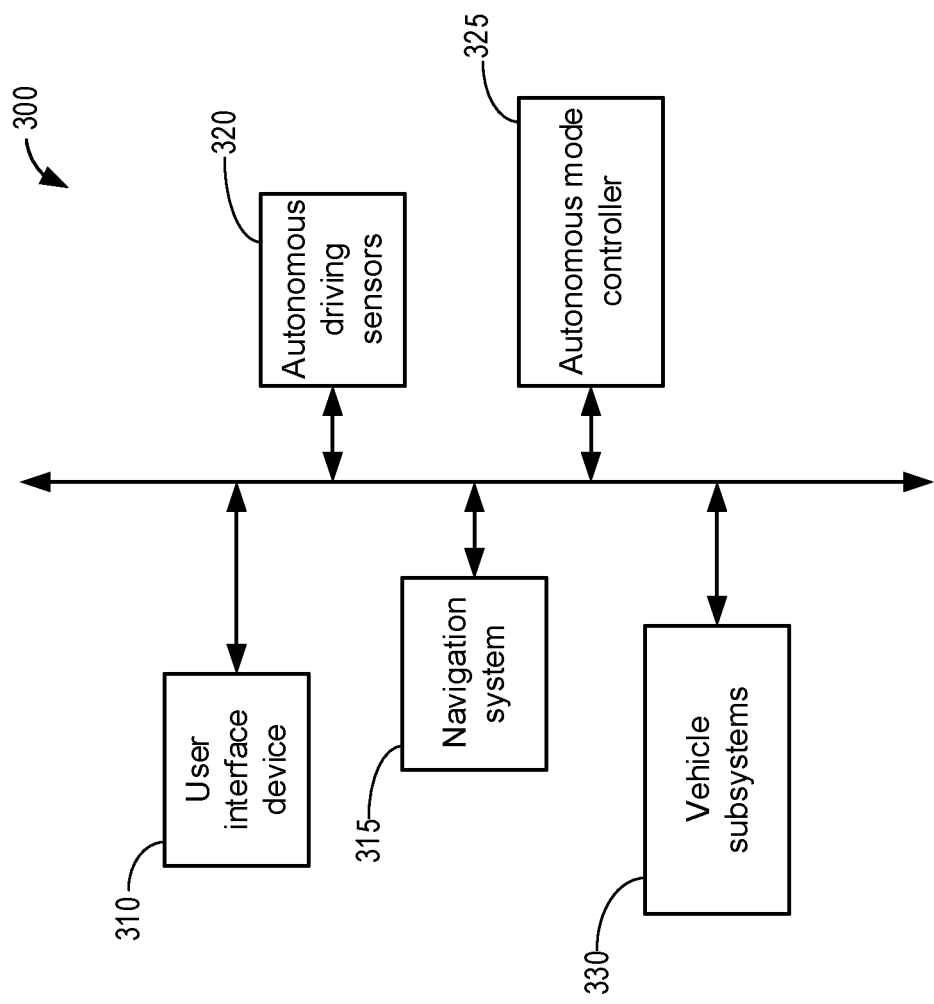
FIG. 3 schematically illustrates a block diagram of an example autonomous driving system.
Figure 6:
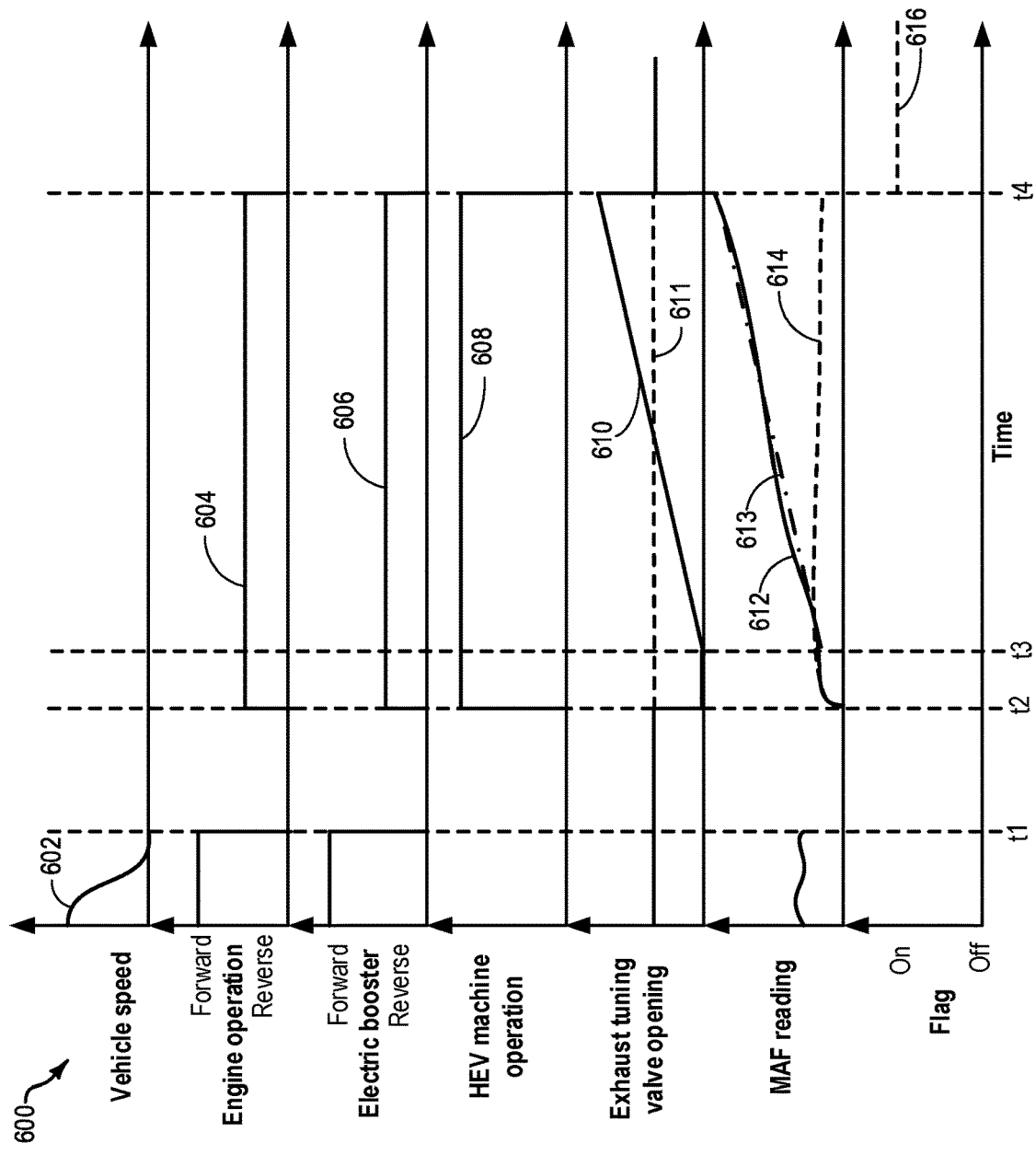
FIG. 6 shows an example operation of the engine and the electric booster for exhaust tuning valve diagnostics, according to the present disclosure.
Figure 7A:
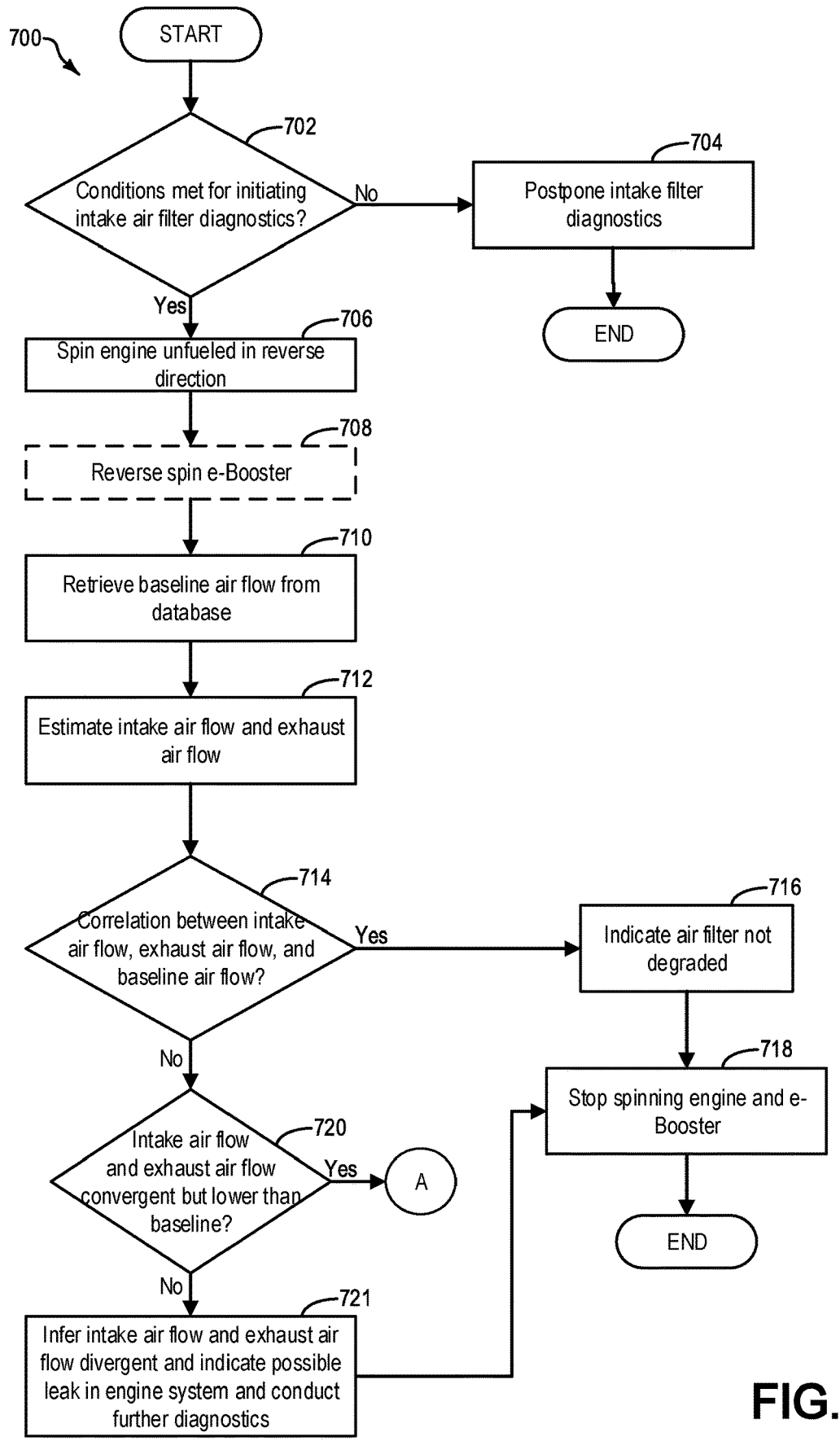
FIGS. 7A and 7B show a flow chart illustrating an example method for diagnosing degradation of an intake air filter.
Figure 7B:
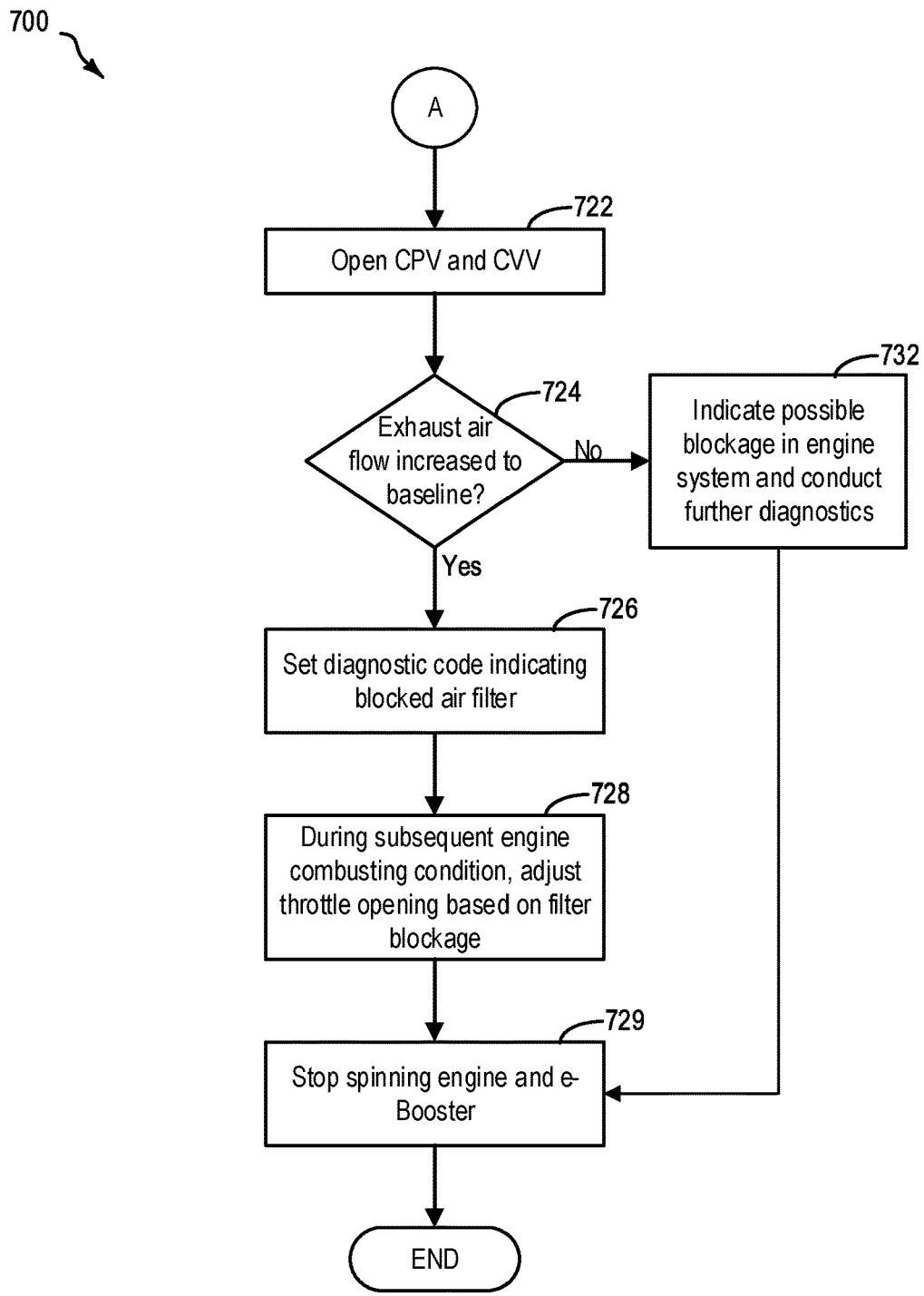
Figure 8:
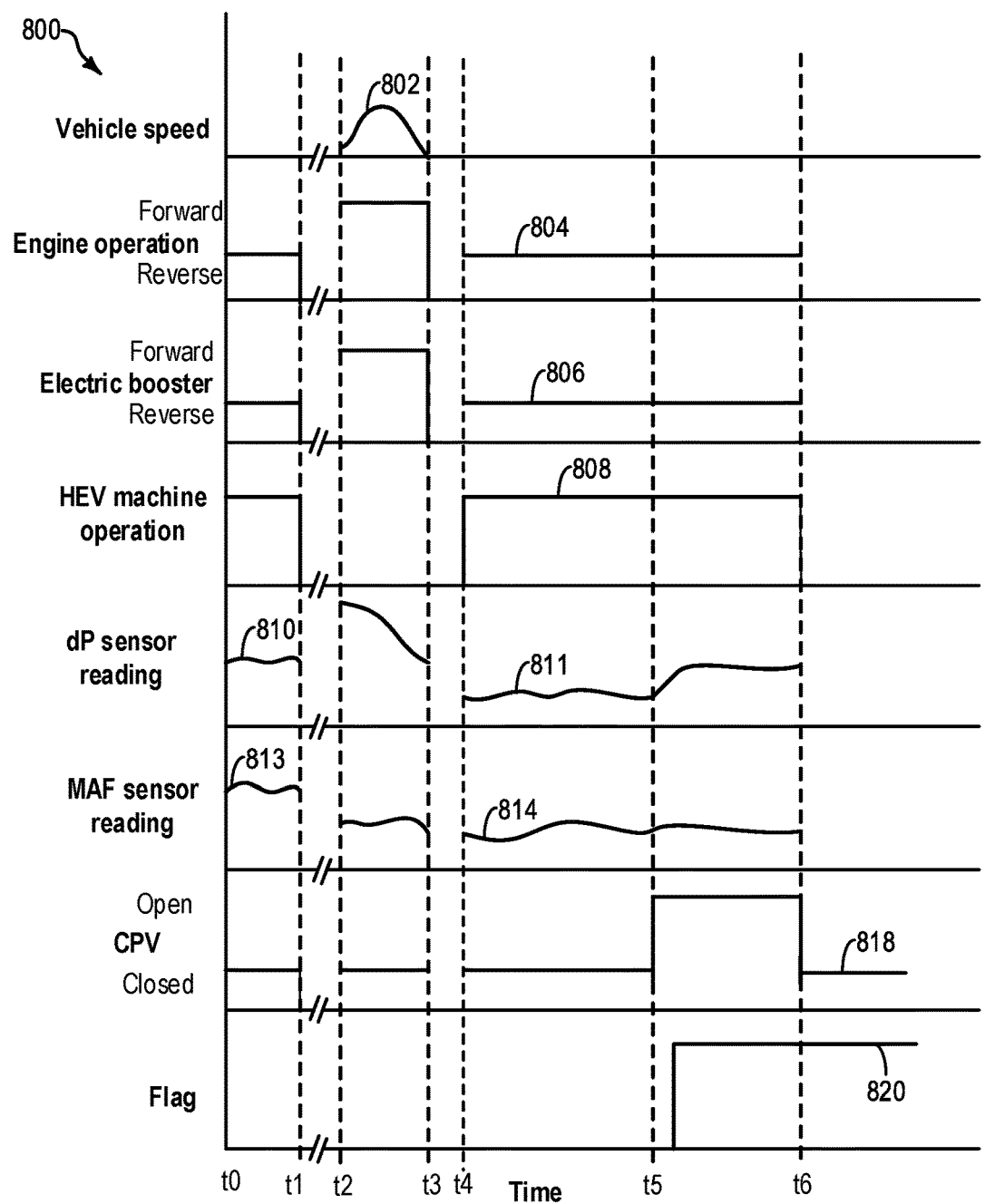
FIG. 8 shows an example operation of the engine and the electric booster for intake air filter diagnostics, according to the present disclosure.

The following description relates to systems and methods for diagnostics of an exhaust tuning valve and an intake air filter during vehicle-off conditions. Such methods may include spinning or rotating an engine without fuel injection, where spinning the engine unfueled is conducted via an electric motor of a hybrid vehicle, such as the hybrid vehicle depicted at FIG. 1. The exhaust tuning valve used for regulation of exhaust noise and the intake air filter used for cleaning ambient air that enters the engine intake manifold are shown in FIG. 2. In some examples, a set of predetermined conditions for conducting the diagnostics of one or more of the exhaust tuning valve and the intake air filter may comprise an indication that the vehicle is not occupied. Thus, such measurements may in some examples be carried out in an autonomous vehicle that is not occupied, where FIG. 3 depicts an example autonomous vehicle control system. For spinning the engine unfueled in the forward and reverse directions, an H-bridge circuit may be utilized, such as the H-bridge circuit depicted at FIGS. 4A-4B. An engine controller may be configured to perform a control routine, such as the example routine of FIG. 5, to diagnose degradation of the exhaust tuning valve. The engine controller may execute the example routines of FIGS. 7A-B to detect a blocked intake air filter. Example electric booster operations and engine operations to enable exhaust tuning valve diagnostics and intake air filter diagnostics are shown in FIGS. 6 and 8, respectively.

Figure 1:
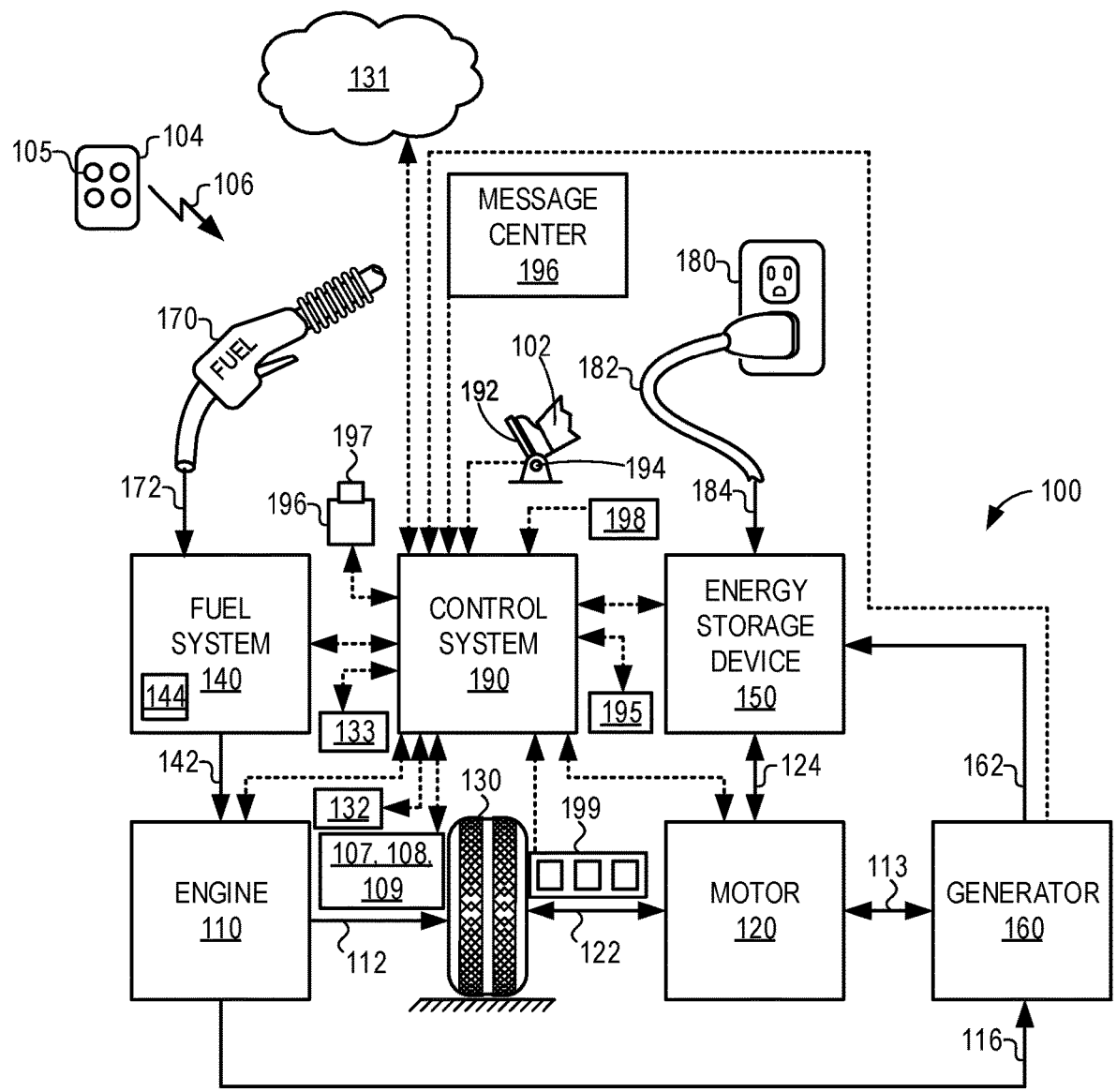
FIG. 1 schematically shows an example hybrid vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 113 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in detail below, motor 120 may in some examples be utilized to spin or rotate the motor in an unfueled configuration. More specifically, motor 120 may rotate the engine unfueled, using power from onboard energy storage device 150, which may include a battery, for example. In a case where motor 120 is used to rotate the engine unfueled, fuel injection to engine cylinders may be prevented, and spark may not be provided to each of the engine cylinders.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

The vehicle system 100 may include a human machine interface (HMI) 133 coupled to the vehicle dashboard via which an operator may communicate with the control system 190. The HMI 133 may include a touch-sensitive display screen. In one example, via an input to the HMI 133, the operator may specify a level of desired engine exhaust noise. The operator may also desire to adjust the level of exhaust noise based on the time of day. In one example, the operator may set the exhaust noise to a lower level during early morning hours and then change the noise level to a higher level during a later time in the day. In another example, the operator may desire to maintain a constant level of exhaust noise and may not frequently alter the setting for the desired exhaust noise level. Based on a desired level of exhaust noise, a position of a butterfly plate of an exhaust tuning valve may be adjusted to alter exhaust flow via an exhaust muffler. The exhaust system along with the exhaust tuning valve is described with relation to FIG. 2.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be utilized in conjunction with route learning methodology, such that routes commonly traveled by a vehicle may be learned by the vehicle control system 190. In some examples, other sensors, such as lasers, radar, sonar, acoustic sensors, etc., may be additionally or alternatively utilized in conjunction with the onboard navigation system to conduct route learning of commonly traveled routes by the vehicle.

Vehicle system 100 may also include sensors dedicated to indicating the occupancy-state of the vehicle, for example seat load cells 107, door sensing technology 108, and onboard cameras 109.

FIG. 2 shows a schematic depiction 200 of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 219. It may be understood that fuel system 219 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system.

The engine system 208 may include an engine 110 having a plurality of cylinders 230. While not explicitly shown, it may be understood that each cylinder may include one or more intake valve(s) and one or more exhaust valve(s). The engine 110 includes an engine air intake 223 and an engine exhaust 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device (e.g. 150), such as a battery. Further, engine air intake 223 may include an air box and intake filter 215 positioned upstream of throttle 262.

In the depicted embodiment, engine 110 is a boosted engine coupled to a turbocharger including a compressor 114 driven by a turbine 116. Specifically, fresh air is introduced along intake passage 242 into engine 110 via intake air filter 215 and flows to compressor 114. The compressor may be any suitable intake-air compressor, such as a motor-driven or driveshaft driven supercharger compressor. In engine system 110, the compressor is a turbocharger compressor mechanically coupled to turbine 116 via a shaft 19, the turbine 116 driven by expanding engine exhaust.

As shown in FIG. 2, compressor 114 is coupled through charge-air cooler (CAC) 118 to throttle valve 262. From the compressor, the compressed air charge flows through the charge-air cooler 118 and the throttle valve 262 to the intake manifold 244.

To assist the turbocharger, an electric booster 155 (eBooster) may be incorporated into the vehicle propulsion system. Electric booster 155 may be powered via an onboard energy storage device 250, which may comprise a battery, capacitor, supercapacitor, etc. In one example, electric booster 155 may be activated (actuated on) in response to a demand for wheel torque, in order to provide the desired boost air rapidly to the engine without delay as may otherwise occur if the turbocharger was utilized without the electric booster. In such an example, responsive to the turbocharger spooling up to a threshold speed (e.g. 70,000 rpm), the electric booster 155 may be actuated off, or deactivated. More specifically, operational control of the electric booster 155 may be under control of the vehicle controller (e.g. controller 12). For example, the controller may send a signal to an electric booster actuator 155b, which may actuate on the electric booster. In another example, the controller may send a signal to the electric booster actuator 155b, which may actuate off the electric booster. In one example the electric booster actuator may comprise a motor which drives the compression of air.

Electric booster 155 may be positioned between a first electric booster conduit 159a, and a second electric booster conduit 159b. First electric booster conduit 159a may fluidically couple intake passage 42 to electric booster 155 upstream of electric booster bypass valve 161. Second electric booster conduit 159b may fluidically couple electric booster 155 to intake passage 42 downstream of electric booster bypass valve 161. As an example, air may be drawn into electric booster 155 via first electric booster conduit 159a upstream of electric booster bypass valve 161, and compressed air may exit electric booster 155 and be routed via second electric booster conduit to intake passage 42 downstream of electric booster bypass valve 161. In this way, compressed air may be routed to engine intake 244.

In circumstances where the electric booster 155 is activated to provide boost more rapidly than if the turbocharger were solely relied upon, it may be understood that electric booster bypass valve 161 may be commanded closed while electric booster 155 is activated. In this way, intake air may flow through turbocharger and through electric booster 155. Once the turbocharger reaches the threshold speed, the electric booster 155 may be turned off, and the electric booster bypass valve 161 may be commanded open. In one example, when the engine is rotated in a reverse direction, the electric booster may also be rotated in a direction opposite to the default direction of rotation in order to create an air flow from the exhaust passage to the engine cylinders 230.

The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Alternatively, MAP may be inferred from alternate engine operating conditions, such as mass air flow (MAF), as measured by MAF sensor 210 coupled to the intake manifold.

Engine exhaust system 225 may further include a gasoline particulate filter (GPF) 217. GPF 217 may comprise a particulate filter, hydrocarbon trap, a catalyzed wash coat, or combination thereof. In some examples, during operation of engine 110, GPF 217 may be periodically regenerated by operating at least one cylinder of the engine within a particular air-fuel ratio to increase a temperature of GPF 217, such that retained hydrocarbons and soot particles may be oxidized.

In some examples, temperature sensor 226 may be positioned upstream from the inlet of GPF 217 and temperature sensor 229 may be positioned downstream of GPF 217. Temperature sensors 226 and 229 may be used to assess the temperature of GPF 217 for regeneration purposes, for example. Furthermore, pressure in the exhaust system may be assessed by pressure sensor 263. Pressure sensor 263 may be a differential pressure sensor positioned upstream and downstream of GPF 217, for example. Pressure sensor 263 may be used to determine pressure at the inlet of GPF 217 in order to assess operating conditions for air to be introduced to the inlet of GPF 217 for regeneration. Furthermore, in some examples, a soot sensor may be positioned downstream of GPF 217, to assess the level of soot that is released from GPF 217.

A muffler 220 is also positioned downstream of the GPF 217. Muffler 220 may reduce the amplitude of sound pressure created by the exhaust gases prior to their exit into the atmosphere. The exhaust gases may pass through one or more chambers or other sound-reducing structures within the muffler 220 before exiting the muffler via a muffler outlet to the tailpipe 231 of the exhaust system en route to atmosphere.

Exhaust system includes an exhaust tuning valve 218 that is controlled to regulate the portion of exhaust gas that flows through muffler 220. The exhaust tuning valve 218 is mounted in the exhaust system, downstream of the GPF 217 and upstream of tailpipe 231, wherein exhaust tuning valve 218 is coupled in a bypass passage 224 (bypass passage 224 parallel to the exhaust passage 235) to the muffler 220. Exhaust gases exiting via the exhaust system of internal combustion engine 110 may pass through exhaust tuning valve 218 in certain conditions depending on whether the valve is in an open or a closed position. In one embodiment, when the exhaust tuning valve 218 is in the closed position, the exhaust gases may only exit (e.g., to atmosphere) by passing through the muffler 220. When the exhaust tuning valve 218 is in the open position, at least a portion of the exhaust gas may pass through bypass passage 224 shown in FIG. 2, bypassing the muffler 220. In some examples, the exhaust tuning valve may be operated partially open or partially closed, allowing exhaust gases to be routed in part through the muffler and in part through the exhaust tuning valve and into the bypass passage 224, before exiting into the atmosphere.

Engine exhaust noise may be regulated by adjusting an opening of the exhaust tuning valve 218. An operator may indicate a level of desired engine noise via an input to a HMI (such as HMI 133 in FIG. 1) coupled to the vehicle dashboard and the controller 212. When a higher level of exhaust noise is desired, the controller may increase the opening of the exhaust tuning valve 218 to increase the volume of exhaust flowing from downstream of the GPF 217 to the tailpipe via the exhaust tuning valve 218. As the exhaust flowing via the exhaust tuning valve 218 bypasses the muffler 220, the amplitude of sound pressure created by the exhaust gases may not be significantly reduced and there is an increase in the perceived engine exhaust noise. Similarly, when a higher level of exhaust noise is desired, the controller may close the exhaust tuning valve 218 to route the entire volume of exhaust to the tailpipe via the muffler 220, wherein the amplitude of the sound pressure may be attenuated and a lower engine exhaust sound is perceived by the operator.

The controller may periodically or opportunistically carry out diagnostics of the exhaust tuning valve 218 during conditions when the vehicle (vehicle system 206) is not occupied and the vehicle is not in motion. The engine is spun in reverse unfueled, via a motor powered by a battery, a position of the exhaust tuning valve 218 is varied from a completely closed position to a completely open position at a constant rate, and the intake air flow at each position of the exhaust tuning valve is estimated via the MAF sensor 210. The exhaust tuning valve may be indicated to be not degraded responsive to the intake air flow decreasing at each position of the exhaust tuning valve from a highest intake air flow at the completely open position to a lowest the intake air flow at the completely closed position. Correspondingly, degradation of the exhaust tuning valve may be indicated responsive to the intake air flow at each position of the exhaust tuning valve being unchanged. Further, while the engine is spun in reverse, the intake electric booster 155 is operated in a reverse direction to increase the ambient air flow from an engine exhaust passage 235 to the engine intake manifold 244 via one or more engine cylinders 230.

During the reverse rotation of the engine, the MAP sensor 213 may also be used for diagnostics of the exhaust tuning valve 218. In one example, during reverse rotation of the engine, the exhaust tuning valve 218 may be first commanded to a closed position and after a threshold duration has elapsed since closing the exhaust tuning valve 218, the valve may be actuated to a completely open position. The threshold duration may be calibrated based on stabilization of intake manifold air pressure during the reverse rotation of the engine. As the exhaust tuning valve 218 is opened, there is an increase in the amount of air routed into the engine system causing a corresponding increase in the intake manifold pressure. If it is observed that upon opening the exhaust tuning valve 218, there is a corresponding increase (such as more than 5%) in MAP sensor 213 reading, it may be inferred that the exhaust tuning valve 218 could be actuated from the closed position to the open position and is not stuck. However, if it is observed that after opening the exhaust tuning valve 218, MAP sensor 213 reading does not change appreciably (such as more than 5%), it may be inferred that the exhaust tuning valve 218 is stuck and may not be actuatable. As the engine is rotated in reverse, the exhaust valve may be open for a longer duration, thereby allowing a higher pressurization of the intake manifold at a lower engine speed. By operating the engine at the lower engine speed, power consumption from the electric motor may be reduced and the diagnostics may be carried out with lower engine noise generation. In this way, during a first engine operating condition the engine may be rotated in a forward direction with fuel being injected via fuel injectors 266, and the electric booster 155 may be rotated in a forward direction based on torque demand and during a second engine operating condition, the engine may be rotated in a reverse direction, unfueled, via an electric machine, and the electric booster 155 may be rotated in a reverse direction during the diagnosing of the exhaust tuning valve. Details of the diagnostic method of the exhaust tuning valve 218 is elaborated in FIG. 5.

Fuel system 219 may include a fuel tank coupled to a fuel pump system 221. It may be understood that fuel tank may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 219 may be a return-less fuel system, a return fuel system, or various other types of fuel system. Fuel tank may hold a plurality of fuel blends, including fuel with a range of alcohol concentrations, such as various gasoline-ethanol blends, including E10, E85, gasoline, etc., and combinations thereof.

Vapors generated in fuel system 219 may be routed to an evaporative emissions control system 251 which includes a fuel vapor canister 222 via vapor recovery line 278, before being purged to the engine air intake 223. Vapor recovery line 278 may be coupled to fuel tank via one or more conduits and may include one or more valves for isolating the fuel tank during certain conditions.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 219.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 219 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank with the atmosphere. FTIV 252 may be positioned between the fuel tank and the fuel vapor canister 222 within vapor recovery line 278. FTIV 252 may be a normally closed valve, that when opened, allows for the venting of fuel vapors from fuel tank to fuel vapor canister 222. Fuel vapors may then be vented to atmosphere, or purged to engine intake system 223 via canister purge valve 261.

Fuel system 219 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open FTIV 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation FTIV 252, while maintaining canister purge valve 261 closed, to depressurize the fuel tank before allowing enabling fuel to be added therein. As such, FTIV 252 may be kept open during the refueling operation to allow refueling vapors to be stored in the canister. After refueling is completed, the FTIV 252 may be closed.

As yet another example, the fuel system may be operated in a canister purging mode (e.g., after an emission control device light-off temperature has been attained and with the engine combusting air and fuel), wherein the controller 212 may open canister purge valve 261 while closing FTIV 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, pressure sensor 263 coupled across the particulate filter 217, temperature sensors 233, 226, and 229, MAP sensor 213, MAF sensor 210, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297, exhaust tuning valve 218, and electric booster actuator 155b. The controller may receive input data from the various sensors, process the input data, and trigger the actuators in response to the processed input data based on instruction or code programmed therein corresponding to one or more routines. In one example, during a vehicle-off condition, the controller may opportunistically carry out a diagnostic method for the exhaust tuning valve 218. The controller may send a signal to each of the electric booster actuator 155b to rotate the electric booster in a reverse direction to flow in ambient air via the tailpipe 231 while continually altering the opening of the exhaust tuning valve 218 and monitoring the air flow via the MAF sensor 210. In another example, during a vehicle-off condition, the controller may opportunistically carry out a diagnostic method for the intake air filter 215. The controller may send a signal to each of the electric booster actuator 155b to rotate the electric booster in a reverse direction to flow in ambient air via the tailpipe 231 while monitoring the air flow via the pressure sensor 263 and the MAF sensor 210.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

For example, a wakeup capability may enable a circuit to wake the controller in order to opportunistically conduct diagnostics of the intake air filter 215. During a vehicle key-off condition, the engine may be spun unfueled, air flow through the exhaust system and air flow through the intake system may be compared to each other and to a baseline air flow, and in response to the air flow through the exhaust system being substantially equal to the air flow through the intake system and each of the air flow through the exhaust system and the air flow through the intake system being lower than the baseline air flow, an air flow blockage may be indicated. The air flow blockage may be indicated as a blocked intake air filter 215 based on an increase in the air flow through the exhaust system to the baseline air flow upon opening a secondary path to atmosphere. The secondary path to the atmosphere may be from downstream of the MAF sensor 210 to atmosphere via the canister purge line 228, the canister 222, and the canister ventilation path 227 of the evaporative emissions control system 251, and the secondary path may be opened by actuating each of the canister purge valve 261 to an open position and the canister vent valve 297 to an open position.

Air flow through the exhaust system is estimated via the differential pressure (dP) sensor 263 coupled across the particulate filter 217 and air flow through the intake system is estimated via the MAF sensor 210. During diagnostics of the intake air filter 215, the intake electric booster 155 may also be operated in a reverse direction to route ambient air from an engine exhaust passage 235 to the engine intake manifold 244 via one or more engine cylinders.

Diagnostic routines for the exhaust tuning valve and the air filter may be conducted in a vehicle configured as an autonomous vehicle and an example autonomous driving system is discussed below with regard to FIG. 3. FIG. 3 is a block diagram of an example autonomous driving system 300 that may operate the vehicle system 100, described above at FIG. 1. Herein, the vehicle system 100 will be referred to simply as a "vehicle". The autonomous driving system 300, as shown, includes a user interface device 310, a navigation system 315, at least one autonomous driving sensor 320, and an autonomous mode controller 325. It may be understood that the onboard navigation system 315 may be the same as the onboard navigation system 132 depicted at FIG. 1 and the user interface device 310 may be the same as the HMI 133 depicted at FIG. 1.

The user interface device 310 may be configured to present information to vehicle occupants, under conditions wherein a vehicle occupant may be present. However, it may be understood that the vehicle may be operated autonomously in the absence of vehicle occupants, under certain conditions.

The presented information may include audible information or visual information. Moreover, the user interface device 310 may be configured to receive user inputs. Thus, the user interface device 310 may be located in the passenger compartment (not shown) of the vehicle. In some possible approaches, the user interface device 310 may include a touch-sensitive display screen.

The navigation system 315 may be configured to determine a current location of the vehicle using, for example, a Global Positioning System (GPS) receiver configured to triangulate the position of the vehicle relative to satellites or terrestrial based transmitter towers. The navigation system 315 may be further configured to develop routes from the current location to a selected destination, as well as display a map and present driving directions to the selected destination via, for example, the user interface device 310.

The autonomous driving sensors 320 may include any number of devices configured to generate signals that help navigate the vehicle. Examples of autonomous driving sensors 320 may include a radar sensor, a lidar sensor, a vision sensor (e.g. a camera), vehicle to vehicle infrastructure networks, or the like. The autonomous driving sensors 320 may enable the vehicle to "see" the roadway and vehicle surroundings, and/or negotiate various obstacles while the vehicle 100 is operating in autonomous mode. The autonomous driving sensors 320 may be configured to output sensor signals to, for example, the autonomous mode controller 325.

The autonomous mode controller 325 may be configured to control one or more subsystems 330 while the vehicle is operating in the autonomous mode. Examples of subsystems 330 that may be controlled by the autonomous mode controller 325 may include a brake subsystem, a suspension subsystem, a steering subsystem, and a powertrain subsystem. The autonomous mode controller 325 may control any one or more of these subsystems 330 by outputting signals to control units associated with subsystems 330. In one example, the brake subsystem may comprise an anti-lock braking subsystem, configured to apply a braking force to one or more of wheels. Discussed herein, applying the braking force to one or more of the vehicle wheels may be referred to as activating the brakes. To autonomously control the vehicle, the autonomous mode controller 325 may output appropriate commands to the subsystems 330. The commands may cause the subsystems to operate in accordance with the driving characteristics associated with the selected driving mode. For example, driving characteristics may include how aggressively the vehicle accelerates and decelerates, how much space the vehicle leaves behind a front vehicle, how frequently the autonomous vehicle changes lanes, etc.

Figure 4A:
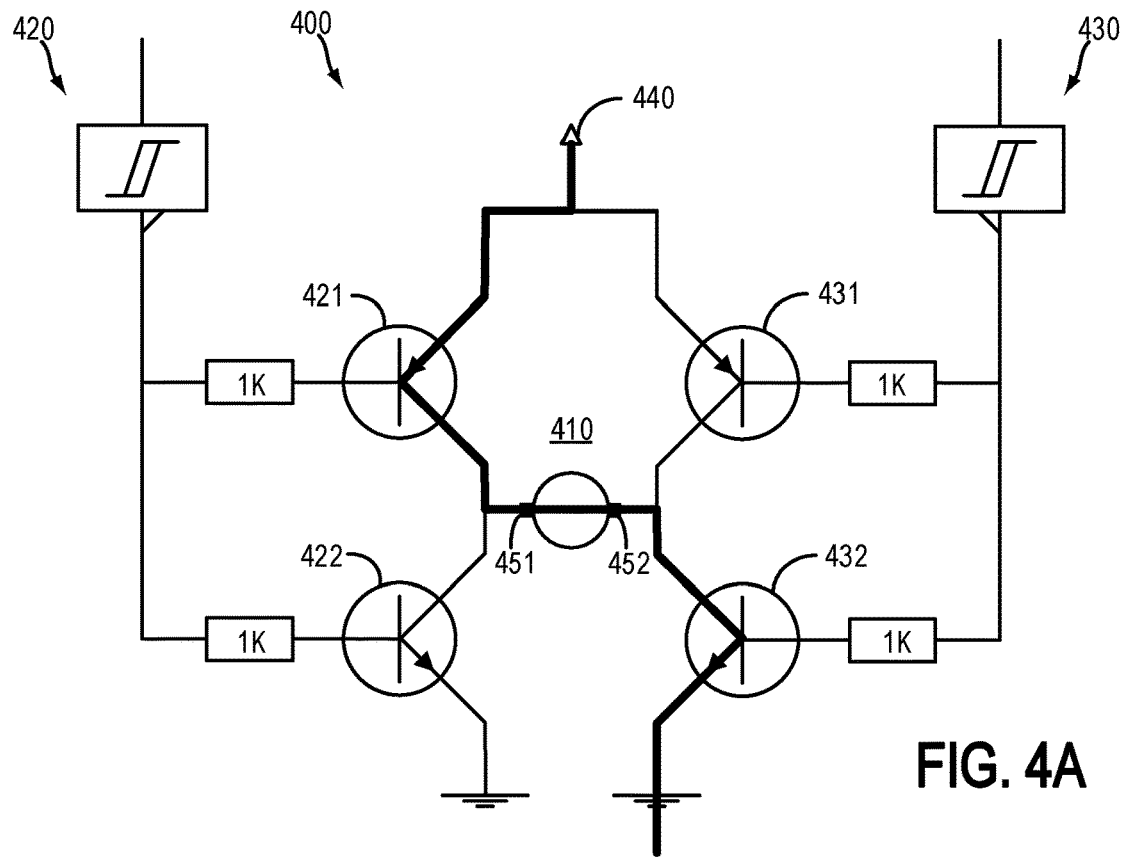
FIGS. 4A and 4B schematically shows an example H-bridge circuit which may be used to rotate a vehicle engine in a forward or reverse direction.
Figure 4B:
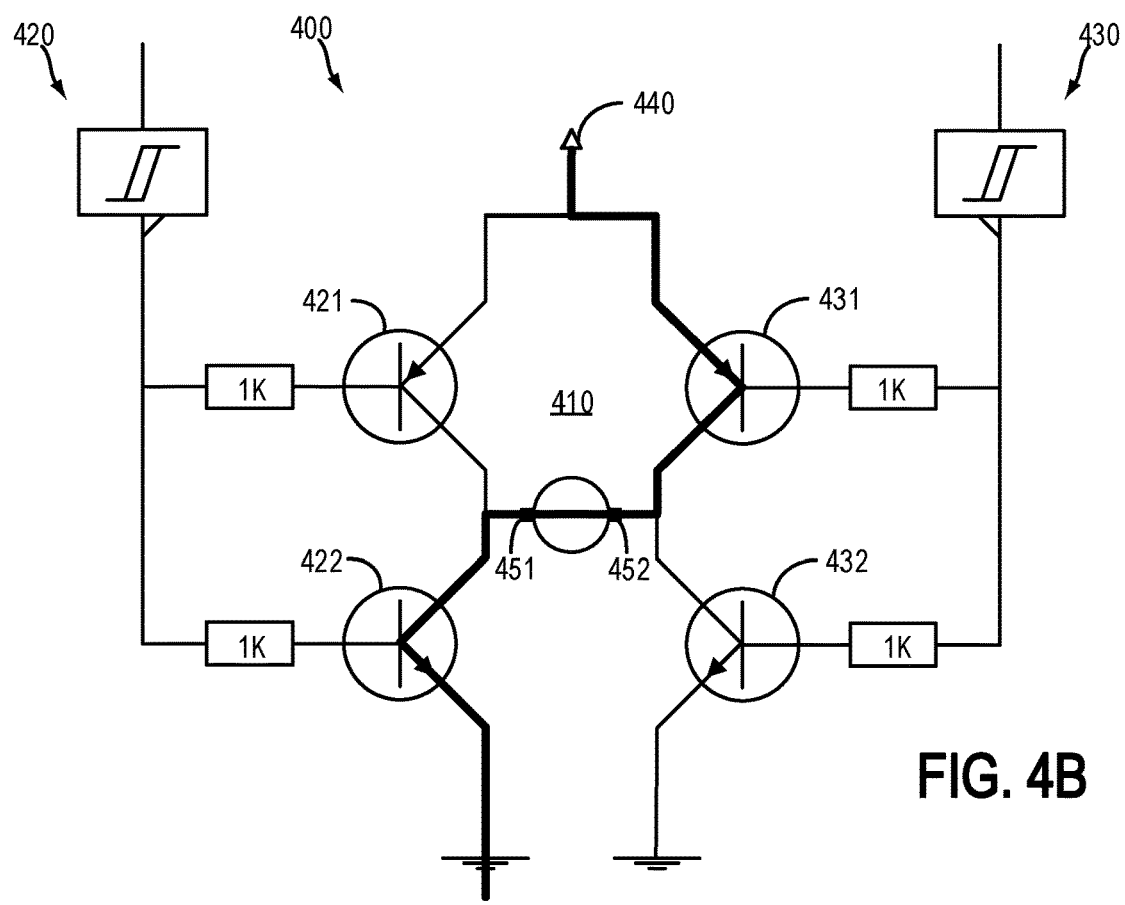

FIGS. 4A and 4B show an example circuit 400 that may be used for reversing a spin orientation of an electric motor. Circuit 400 schematically depicts an H-Bridge circuit that may be used to run a motor 410 in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated (energized), while transistors 422 and 431 are off. In this configuration, the left lead 451 of motor 410 is connected to power source 440, and the right lead 452 of motor 410 is connected to ground. In this way, motor 400 may run in a forward (or default) direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 4B, transistors 422 and 431 are activated (energized), while transistors 421 and 432 are off. In this configuration, the right lead 452 of motor 410 is connected to power source 440, and the left lead 451 of motor 410 is connected to ground. In this way, motor 410 may run in a reverse direction.

In this way, the components of FIGS. 1-4A-B provide for a system for a hybrid vehicle comprising: a vehicle, an engine, an electric machine coupled to a battery capable of rotating the engine, an intake passage including an intake air filter and a compressor, an exhaust passage including a particulate filter, a manifold air flow (MAF) sensor coupled to the intake passage, a differential pressure sensor coupled across the particulate filter, a canister purge line and a ventilation path coupling the intake passage to atmosphere via a canister, the canister purge line including a canister purge valve (CPV) and the ventilation path including a canister vent valve (CVV). The vehicle further includes a controller with computer readable instructions stored on non-transitory memory for: obtaining a baseline air flow via the MAF sensor by reverse rotating the engine with the electric machine when the intake air filter is first installed; and after usage of the intake air filter for a threshold duration since the intake air filter is installed and while the engine is rotated in reverse by the electric machine, obtaining a first intake air flow via the MAF sensor and a first exhaust air flow via the differential pressure sensor, comparing the first intake air flow, the first exhaust air flow, and the baseline air flow, and in response to the first intake air flow and the first exhaust air flow being equal to one another and being lower than the baseline air flow, diagnosing the intake air filter responsive to a change in the first exhaust air flow following opening of the CPV and the CVV.

Figure 5:
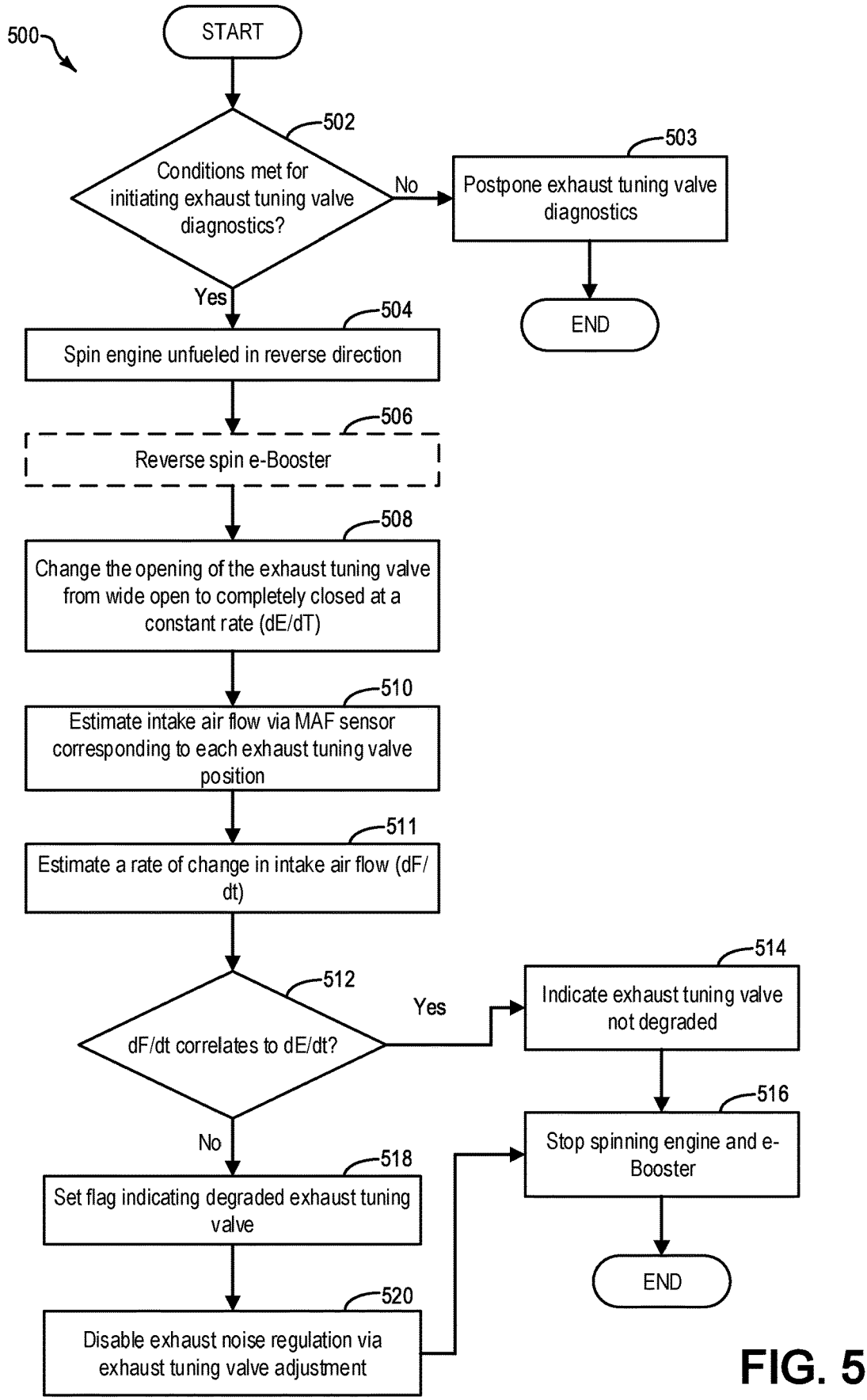
FIG. 5 shows a flow chart illustrating an example method that can be implemented to diagnose degradation of an exhaust tuning valve.

FIG. 5 shows an example method 500 that may be implemented to carry out diagnostics of an exhaust tuning valve during an engine non-combusting condition. Instructions for carrying out method 500 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

At 502, the method includes determining if conditions are met for initiating exhaust tuning valve (such as exhaust tuning valve 218 in FIG. 2) diagnostics. In one example, conditions for initiating exhaust tuning valve diagnostics may include a vehicle-off condition when the vehicle is unoccupied (any passenger is not present in the vehicle). Seat load cells, onboard camera(s), and/or door sensing technology may be utilized to ensure that the vehicle is not occupied. In another example, the tuning valve diagnostics may be carried out during an autonomous vehicle mode when the vehicle is operated without a human driver and when the vehicle is not being propelled by engine torque. The vehicle operation may be controlled from a remote location or may be pre-programed in the controller memory. During vehicle operation in the autonomous node, the diagnostics may be opportunistically carried out when the vehicle is stopped at a traffic signal or immediately upon completion of a drive cycle. In yet another example, the tuning valve diagnostics may be carried out responsive to a wakeup of the controller after a predetermined duration after a key-off event. Conditions for initiating diagnostics of the exhaust tuning valve includes confirmation that the engine sensors such as the MAF sensor, the oxygen sensors, etc. are not degraded and in general there any no diagnostic codes (flags) set indicating degradation of any engine component. Further, prior to initiating the tuning valve diagnostics, the controller may verify if a predetermined duration of time has elapsed since a prior exhaust tuning valve diagnostic routine was carried out. In some examples, such a predetermined duration of time may comprise one day, greater than one day but less than two days, greater than two days, etc. In other examples, the predetermined duration may include a number of miles driven, number of hours of vehicle operation, or other parameter.

If it is determined that the conditions for initiating the exhaust tuning valve diagnostics are not met, at 503, the exhaust tuning valve diagnostic routine may be postponed until the conditions are being met. In some examples, if the exhaust tuning valve diagnostic conditions are not met, current operating parameters may be continued until the exhaust tuning valve diagnostic conditions are met. Such operating parameters may include, if the vehicle is operating, fuel being delivered to one or more engine cylinders via fuel injectors of the fuel system (such as fuel system 219 in FIG. 2) and combustion of air and fuel being carried out in the cylinders. Engine torque produced by combustion in the engine cylinders may be used to propel the vehicle. Vapor generated in the fuel system may be routed to an evaporative emissions control system (such as EVAP system 251 in FIG. 2) which includes a fuel vapor canister via a vapor recovery line. Vapors stored in the canister may be purged to the engine intake manifold via a purge line, a canister purge valve (CPV) regulating flow of vapor from the canister to the engine intake. A vent line may allow fresh air to be drawn into the canister when purging stored fuel vapors to engine intake.

An electric booster (such as electric booster 155 in FIG. 2) may be coupled to a conduit parallel to an intake passage, and during conditions when the boost pressure provided by operating the turbocharger (such as intake compressor 114 and exhaust turbine 116 in FIG. 2) is lower than a desired boost pressure, the electric booster may be operated using energy from an onboard energy storage device to provide the desired boost.

An opening of the exhaust tuning valve may be adjusted based on an operator selected (such as via a human machine interface) level of desired engine noise. When a higher level of exhaust noise is desired, the controller may increase the opening of the exhaust tuning valve to increase the volume of exhaust flowing to the tailpipe via the exhaust tuning valve, bypassing the muffler. As the exhaust flowing via the exhaust tuning valve bypasses the muffler, the amplitude of sound pressure created by the exhaust gases may not be significantly reduced thereby causing an increase in the perceived engine exhaust noise.

If it is determined that conditions for initiating the exhaust tuning valve diagnostics are met, at 504, the routine includes rotating or spinning the engine unfueled at a predetermined speed (e.g., predetermined RPM), in the reverse direction. Rotating the engine in the reverse direction may comprise rotating the engine in the opposite direction as when the engine is operated to combust air and fuel. Rotating the engine unfueled in the reverse direction may include routing air flow through the exhaust system, the engine, and the intake manifold, in that order. Rotating the engine unfueled in the reverse direction may comprise rotating the engine via the motor (such as motor 120 in FIG. 1), where the motor may be powered via the onboard energy storage device (such as energy storage device 150 in FIG. 1), such as a battery. In a non-hybrid vehicle, the engine may be reverse rotated via a starter motor and a battery of the vehicle. To rotate the engine in reverse, an H-bridge circuit, such as that depicted at FIGS. 4A-4B, may be utilized. The speed of the engine may be controlled via the motor, to the predetermined speed. The predetermined engine speed may comprise a speed at which robust measurements of air flow may be obtained via the MAF sensor (such as MAF sensor 210 in FIG. 2) while the engine is being spun in reverse. In one example, the predetermined speed may be lower than 500 rpm. Furthermore, while not explicitly illustrated, it may be understood that the canister purge valve (such as CPV 261 in FIG. 2) may be maintained closed during the spinning the engine, in order to ensure that air is not routed to the evaporative emissions system and/or fuel system. Still further, while not explicitly shown, for vehicles equipped with exhaust gas recirculation (EGR) (e.g. high pressure EGR and/or low pressure EGR), one or more valve(s) controlling exhaust gas recirculation may be commanded or maintained closed.

At 506, an electric booster (such as electric booster 155 in FIG. 2) may be rotated in a reverse direction. During conditions when the boost pressure provided by operating the turbocharger is lower than a desired boost pressure, the electric booster may be operated in a forward, default direction, to provide the desired boost. Reverse rotation of the electric booster creates a lower pressure at the exhaust manifold, thereby facilitating air flow through the exhaust system, the engine, and the intake manifold. The controller may send a signal to the electric booster actuator (such as actuator 155b in FIG. 1) to actuate the electric booster using energy from the energy storage device (such as energy storage device 250 in FIG. 1) coupled to the electric booster. The speed of rotation of the electric booster during the diagnostic routine may be lower than the speed of rotation of the electric booster when operated to compensate for the lag of the mechanical turbocharger. In one example, the speed of rotation of the electric booster during the diagnostics routine may be 2500 RPM. By operating the electric booster to a lower speed, power consumption may be reduced and noise generation during operation of the electric booster may also be reduced. In one example, step 506 of method 500 may be optional and diagnostics of the exhaust tuning valve may be carried out without spinning the electric booster. The electric booster may be maintained in a deactivated condition while the engine is reverse rotated during the exhaust tuning valve diagnostic routine. At 508, the opening of an exhaust tuning valve may be varied from a wide open position (wide open throttle) to a completely closed position. The controller may send a signal to an actuator coupled to the exhaust tuning valve to actuate the position of the exhaust tuning valve to a completely open position and then actuate the position of the valve from the complete open position to a completely closed position. The opening of the exhaust tuning valve may be decreased from the completely open position to a completely closed position at a constant rate (dE/dt). In one example, the sweep rate of the butterfly plate in the exhaust tuning valve may be 5 seconds over the 90 degree travel.

As the position of the exhaust tuning valve is altered, air flow into the exhaust system may be varied. In one example, when the exhaust tuning valve is in a wide open position, due to the low pressure created in the engine intake manifold by reverse rotation of the engine and the electric booster, ambient air may flow into the exhaust manifold via each of the muffler and the bypass passage (such as bypass passage 224 in FIG. 2). The air entering the exhaust manifold may continue to flow via the engine cylinders and then enter the intake manifold. The ambient air may then exit the engine system via the intake passage. As the opening of the exhaust tuning valve is reduced, the pathway for air flow via the bypass passage becomes constricted and airflow is limited to the pathway via muffler and the total volume of air entering the exhaust manifold may reduce. Upon completely closing the exhaust tuning valve, air may no longer flow into the exhaust manifold via the bypass passage and therefore the total volume of air entering the exhaust manifold may further reduce.

Alternatively, the controller may send a signal to an actuator coupled to the exhaust tuning valve to first actuate the position of the exhaust tuning valve to a completely closed position and then actuate the position of the valve from the complete closed position to a completely open position. The opening of the exhaust tuning valve may be increased from the completely closed position to the completely open position at the constant rate.

At 510, for each position of the exhaust tuning valve, the amount of air flowing through the exhaust manifold, and then through the cylinders and the intake manifold may be estimated via a manifold air flow sensor (such as MAF sensor 210 in FIG. 2). The amount of air flowing through the engine components may be directly proportional to the degree of opening of the exhaust tuning valve. In one example, the amount of air entering the exhaust manifold may increase with an increase in the exhaust tuning valve opening and correspondingly, the amount of air entering the exhaust manifold may decrease with a decrease in the exhaust tuning valve opening. Therefore, as the opening of the exhaust tuning valve is reduced from a wide open position to a completely closed position, the MAF sensor reading representative of the intake manifold air flow may proportionally reduce.

At 511, a rate of change of intake air flow (dF/dt) as estimated based on MAF sensor reading is estimated over time. Estimation of dF/dt may be carried out during the time period over which the opening of the exhaust tuning valve is decreased from the completely open position to the completely closed position (at the constant rate). In one example, MAF sensor output may be sampled periodically (e.g., in evenly spaced intervals), beginning when the exhaust tuning valve is at the wide open position (e.g., 100% open) and continuing until the exhaust tuning valve is the fully closed position (e.g., 0% open). During this time, the MAF sensor output may be sampled when the exhaust tuning valve is 90% open, 80% open, 70% open, and so forth. Each time the MAF sensor output is sampled, the sampled output may be stored in memory of the controller. In some examples, a corresponding position of the exhaust tuning valve may also be stored along with the MAF output at that exhaust tuning valve position.

At 512, the routine includes determining if the rate of change of intake air flow (dF/dt) and the rate of change of opening of the exhaust tuning valve (dE/dt) are correlated.

As the opening of the exhaust tuning valve is decreased from the wide open position to the completely closed position at a constant rate (dE/dt), the intake air flow may proportionately decrease. In one example, the routine may determine if dF/dt is directly proportional to dE/dt.

In another example, the routine may include determining if the MAF sensor reading is highest at the exhaust tuning valve wide open position and the MAF sensor reading is lowest at the exhaust tuning valve closed position. As described above, at the wide open positon of the exhaust tuning valve, a highest MAF sensor reading is expected corresponding to a highest volume of ambient air entering the engine system. Also, at the closed position of the exhaust tuning valve, a lowest MAF sensor reading is expected corresponding to a lowest volume of ambient air entering the engine system.

The highest MAF sensor reading described above may be the sampled MAF sensor output that has the highest value of all the sampled MAF sensor outputs collected during the time the exhaust tuning valve is swept from the fully open positon to the fully closed position. The lowest MAF sensor reading described above may be the sampled MAF sensor output that has the lowest value of all the sampled MAF sensor outputs collected during the time the exhaust tuning valve is swept from the fully open positon to the fully closed position.

In yet another example, the routine may include determining if the MAF sensor reading at each position of the exhaust tuning valve readings (e.g., when the tuning valve is at 100%, 75%, 50%, 25%, and 0% open) is substantially equal to an expected intake air flow. In one example, substantially equal may include the MAF sensor reading to be within 5% of the expected intake air flow. The controller may use a look-up table to determine an expected intake air flow corresponding to an exhaust tuning valve opening. As an example, the input to the look-up table may be the exhaust tuning valve opening with the output being the intake air flow. With a decrease in the tuning valve opening, the expected intake air flow may proportionately decrease.

If it is determined that the rate of change of intake air flow (dF/dt) and the rate of change of opening of the exhaust tuning valve (dE/dt) are correlated (directly proportional), it may be inferred the exhaust tuning valve was successfully actuated from a completely open position to a fully closed position and is not stuck in any position between the completely open position and the closed position.

If it is determined that the MAF sensor reading is highest at the exhaust tuning valve wide open position and the MAF sensor reading is lowest at the exhaust tuning valve closed position, it may also be inferred the exhaust tuning valve was successfully actuated from a completely open position to a fully closed position. Also, if for each position of the exhaust tuning valve, the MAF sensor reading is substantially equal to the expected intake air flow, it may be inferred that the exhaust tuning valve is not stuck at any position between the completely open and the completely closed positions. Therefore, at 514, it may be indicated that the exhaust tuning valve is not degraded. At 516, the diagnostic routine is completed and each of the engine and the electric booster may no longer be rotated. The controller may send a signal to the motor powering the engine to stop rotating the engine. The controller may also send a signal to the actuator coupled to the electric booster to suspend operation of the electric booster.

If at 512 it is determined that the rate of change of intake air flow (dF/dt) and the rate of change of opening of the exhaust tuning valve (dE/dt) are not directly proportional, it may be inferred that the exhaust tuning valve could not be actuated from a completely open position to a fully closed position. If it is determined that the MAF sensor reading is not highest at the exhaust tuning valve wide open position and/or the MAF sensor reading is not lowest at the exhaust tuning valve closed position and/or for each position of the exhaust tuning valve, the MAF sensor reading is not substantially equal to the expected intake air flow, it may be inferred that the exhaust tuning valve is degraded. At 518, a diagnostic code (flag) may be set indicating degradation of the exhaust tuning valve. In one example, degradation of the valve may include the valve being stuck at a fixed position (such as the completely open position, the completely closed position, or a position in between the completely open and completely closed positions) even when it is actuated to move to a different position. In another example, degradation of the valve may include a leak in the valve causing air to flow via the bypass passage and the valve even when it is commanded to a completely closed position.

Since the valve is degraded, it may not be possible to suitably adjust the position of the valve corresponding to the desired exhaust noise setting, thereby adversely affecting the driving experience. Therefore, in response to the indication of degradation of the exhaust tuning valve, at 520, engine exhaust noise regulation via adjustments of the exhaust tuning valve may be disabled until the valve has been serviced.

In this way, when the vehicle is operated without a human driver and when the vehicle is not being propelled by engine torque, during a first engine operating condition, a position of the exhaust tuning valve may be adjusted based on an operator selected noise mode, and during a second engine operating condition, an opening of the exhaust tuning valve may be adjusted from a completely closed position to a completely open position, an intake air flow may be estimated corresponding to each opening of the exhaust tuning valve via the MAF sensor, and the exhaust tuning valve may be diagnosed based on a change in the intake airflow with an increase in the opening of the exhaust tuning valve. The first engine operating condition includes the engine being rotated in a forward direction with fuel being injected via fuel injectors, and the electric booster being rotated in a forward direction based on torque demand and the second engine operating condition includes the engine being rotated in a reverse direction, unfueled, via an electric machine.

FIG. 6 shows an example timeline 600 illustrating diagnostics of an exhaust tuning valve (such as exhaust tuning valve 218 in FIG. 2). The horizontal (x-axis) denotes time and the vertical markers t1-t4 identify significant times in the routine for operation of the electric booster.

The first plot, line 602, shows variation in vehicle speed over time. The second plot, line 604, shows a direction of rotation of the engine. The engine may be rotated in a forward, default, direction, for example during engine operation with air fuel combustion in the engine cylinders, the fuel being supplied to the engine cylinders via fuel injectors. Alternatively, the engine may be rotated in a reverse direction, unfueled, such as via an electric machine coupled to the hybrid electric vehicle (HEV). The third plot, line 606, shows a direction of rotation of an electric booster (such as electric booster 155 in FIG. 1) coupled to a conduit parallel to the intake manifold downstream of an intake compressor and upstream of a charge air cooler (CAC). The electric booster may be rotated in a forward direction or a reverse direction by reversing a circuit of an actuator coupled to the electric booster, the electric booster powered via an onboard energy storage device. The forward direction of rotation of the electric booster is opposite to the reverse direction of rotation of the electric booster. The fourth plot, line 608, shows operation of the electric machine coupled to the hybrid electric vehicle (HEV). The machine may be operated to provide motor torque to propel the HEV. The fifth plot, line 610, shows an opening of an exhaust tuning valve. The sixth plot, line 612, shows a volume of intake air flow as estimated based on input from a manifold air flow (MAF) sensor. Dashed and dotted line 613 shows an expected intake air flow corresponding to the opening of the exhaust tuning valve at any given point of time. The controller uses a look-up table to estimate the expected intake air flow corresponding to each opening of the exhaust tuning valve (e.g., when the tuning valve is at 100%, 75%, 50%, 25%, and 0% open) with the exhaust valve opening as the input and the expected intake air flow as the output of the look-up table. The seventh plot, dashed line 616, shows a flag denoting a diagnostic code set to indicate a degraded exhaust tuning valve.

Prior to time t1, the vehicle is operated via engine torque. The engine is driven by combustion and is rotated in the forward direction. Based on the torque demand, the electric booster is rotated in a forward direction to provide the desired boost pressure. The intake manifold air flow during engine combustion is estimated based on the reading of the MAF sensor. The HEV machine is not operated for engine rotation or vehicle propulsion. Based on a desired engine exhaust noise setting (by the operator via an on-board human machine interface), the exhaust tuning valve is correspondingly maintained at a fixed position between a completely open position and a completely closed position. Since the exhaust tuning valve is not indicated as being degraded, the flag is maintained in an off position.

At time t1, the vehicle speed reduces to zero and between time t1 and t2, the vehicle is no longer operated using engine torque and/or machine torque (vehicle key-off condition begins). Therefore, at time t1, the engine is shut-down by suspending fuel injection and spark to the engine cylinders. The electric booster is no longer operated between time t1 and t2. As the engine is shut down, intake air flow is no longer monitored via the MAF sensor.

At time t2, after a threshold duration has elapsed since the vehicle key-off at time t1, diagnostics of the exhaust tuning valve is initiated by waking up the controller. The controller sends a signal to the HEV machine to spin the engine unfueled in a reverse direction. Also, the controller sends a signal to the actuator coupled to the electric booster to rotate the electric booster in a reverse direction. As the engine and the electric booster are rotated in their respective reverse directions, a lower pressure is created at the engine exhaust manifold and ambient air may enter the engine system via the exhaust passage. The controller then sends a signal to the actuator coupled to the exhaust tuning valve to move the exhaust tuning valve to the completely closed position Between t2 and t3, the air flow flows into the engine system via the muffler (with the exhaust tuning valve closed) and the MAF reading may stabilize.

At time t3, the controller sends a signal to the actuator coupled to the exhaust tuning valve to gradually increase the opening of the exhaust tuning valve from the completely closed position at a constant rate. The rate of increase of the exhaust tuning valve opening is 18 degrees/second. Between time t3 and t4, as the position of the exhaust tuning valve increases, there is a corresponding increase in air flow entering the engine system via the exhaust passage and then flowing to the intake manifold via the engine cylinders. Corresponding to each position of the exhaust tuning valve, an actual air flow through the engine system is monitored via the MAF sensor. The actual air flow (line 612) is compared to the expected air flow (line 613) corresponding to the opening of the exhaust tuning valve at any given point of time. It is observed that the actual air flow correlates with the expected air flow and that the MAF sensor reading increases proportionally to the opening of the exhaust tuning valve.

Therefore, at the end of the diagnostic routine, at time t4, based on the observation that the actual air flow correlates with the expected air flow and the MAF sensor reading is highest corresponding to the fully open positon of the exhaust tuning valve and the MAF sensor reading is lowest corresponding to the fully closed position of the exhaust tuning valve, it is inferred that the exhaust tuning valve is not degraded (not stuck at any place and/or does not have a leak). Since it is inferred that the exhaust tuning valve is not degraded, the flag is maintained in off condition.

At time t4, at the end of the diagnostic routine, the exhaust tuning valve is actuated back to the position of the valve prior to initiation of the diagnostic routine, such as the position of the valve prior to time t3. Also, at time t4, the controller sends a signal to each of the HEV machine and the electric booster actuator to suspend operation and to stop rotating the engine and the electric booster, respectively. After time t4, the vehicle is not propelled using engine torque and/or machine torque and the engine is maintained in the shut-down condition until a subsequent vehicle key-on.

If the exhaust tuning valve is degraded, between time t3 and t4, the MAF sensor reading does not increase proportional to the increase in the exhaust tuning valve opening. As shown by dashed line 611, if the exhaust tuning valve is stuck open at a particular position, even if the controller sends a signal to the actuator coupled to the exhaust tuning valve to gradually actuate the valve from the fully closed position to the fully open position, the valve opening does not change appreciably. Correspondingly, as shown by dashed line 614, the MAF reading remains substantially constant over the duration of the diagnostic routine between time t3 and t4. Due to the substantially constant MAF sensor reading, it may be inferred that the exhaust tuning valve is degraded and a flag indicating the degraded exhaust tuning valve is set at time t4.

In this way, an engine is rotated in a reverse direction and an intake electric booster is rotated in a reverse direction to draw air into the engine through an exhaust passage and then route the air to atmosphere through an intake passage, an opening of an exhaust tuning valve is varied, and a presence or an absence of degradation of the exhaust tuning valve is diagnosed based on a correlation between the opening of the exhaust tuning valve and air flow via the intake passage.

FIG. 7 shows an example method 700 that may be implemented to carry out diagnostics of an intake air filter. Similar to the diagnostics of the exhaust tuning valve, the diagnostics of the intake air filter may be carried out by reverse rotating an engine, unfueled, during an engine non-combusting condition. In one example, during a vehicle key-off condition, the intake air filter diagnostics and the exhaust tuning valve diagnostics may be carried out in succession.

At 702, the routine includes determining if conditions are met for initiating intake air filter (such as intake air filter 215 in FIG. 2) diagnostics. In one example, conditions for initiating intake air filter diagnostics may include a vehicle-off condition when the vehicle is unoccupied (any passenger is not present in the vehicle). Seat load cells, onboard camera(s), and/or door sensing technology may be utilized to ensure that the vehicle is not occupied. In another example, the intake air filter diagnostics may be carried out during an autonomous vehicle mode when the vehicle is operated without a human driver and when the vehicle is not being propelled by engine torque. The vehicle operation may be controlled from a remote location or may be pre-programed in the controller memory. During vehicle operation in the autonomous node, the diagnostics may be opportunistically carried out when the vehicle is stopped at a traffic signal or immediately upon completion of a drive cycle. In yet another example, the intake air filter diagnostics may be carried out responsive to a wakeup of the controller after a predetermined duration after a key-off event. Another condition for initiating an intake air filter diagnostics is that soot load on an exhaust particulate filter (PF) is lower than a threshold soot load. The threshold soot load may correspond to a load on the PF that may not influence the output of a differential pressure (dP) sensor coupled across the PF. As an example, the threshold soot load may correspond to a soot load remaining on a PF at the end of a PF regeneration.

An expected air flow through the intake manifold may be estimated as a function of the intake throttle opening, and an actual air flow through the intake manifold may be estimated based on input from a manifold air flow (MAF) sensor. Due to blockage in the intake air filter, the actual air flow through the intake manifold may reduce to below the expected air flow. A diagnostic for the intake air filter may be opportunistically carried out if it is detected that the actual air flow is lower than the expected air flow.

An expected engine torque output may be estimated based on engine operating conditions including engine speed, engine load, engine temperature, etc. A blocked intake air filter may reduce the amount of air entering the cylinders for combustion, thereby adversely affecting engine torque output. Therefore, a reduction in engine output (sluggish engine) from the expected engine output may trigger an intake air filter diagnostics.

Conditions for initiating diagnostics of the intake air filter includes confirmation that the engine sensors such as the MAF sensor, dP sensor, oxygen sensors, etc. are not degraded and in general there any no diagnostic codes (flags) set indicating degradation of any engine component. Further, prior to initiating the intake air filter diagnostics, the controller may verify if a predetermined duration of time has elapsed since a prior intake air filter diagnostic routine. In some examples, such a predetermined duration of time may comprise one day, greater than one day but less than two days, greater than two days, etc. In other examples, the predetermined duration may include a number of miles driven, number of hours of vehicle operation, or other parameter.

If it is determined that the conditions for initiating the intake air filter diagnostics are not met, at 704, the intake air filter diagnostic routine may be postponed until the conditions are met. In some examples, if the intake air filter diagnostics are not met diagnostic conditions are not met, current operating parameters may be continued until the intake air filter diagnostic conditions are met. During combustion, the intake throttle may be opened to allow air to flow into the intake manifold via the intake air filter. The air filter removes dust, dirt, and other air borne particles from the air entering the intake manifold. Fuel may be delivered to one or more engine cylinders via fuel injectors of the fuel system (such as fuel system 219 in FIG. 2) and engine torque produced by combustion in the engine cylinders may be used to propel the vehicle. Vapor generated in the fuel system may be routed to an evaporative emissions control system (such as EVAP system 251 in FIG. 2) which includes a fuel vapor canister via a vapor recovery line. Vapors stored in the canister may be purged to the engine intake manifold via a purge line, a canister purge valve (CPV) regulating flow of vapor from the canister to the engine intake. A vent line may allow fresh air to be drawn into canister when purging stored fuel vapors to engine intake.

An electric booster (such as electric booster 155 in FIG. 2), coupled to a conduit parallel to an intake passage, may be used to provide a desired boost pressure during conditions when the boost pressure provided by operating the turbocharger (such as intake compressor 114 and exhaust turbine 116 in FIG. 2) is lower than the desired boost pressure.

If it is determined that conditions for initiating the intake air filter diagnostics are met, method 700 proceeds to 706 and includes rotating or spinning the engine unfueled at a predetermined speed (e.g. predetermined RPM), in the reverse direction. Rotating the engine unfueled may comprise rotating the engine in the opposite direction as when the engine is operated to combust air and fuel. Rotating the engine unfueled in the reverse direction may include routing air flow through the exhaust system, the engine, and the intake manifold, in that order. Rotating the engine unfueled in the reverse direction may comprise rotating the engine via the motor (such as motor 120 in FIG. 1), where the motor may be powered via the onboard energy storage device (such as energy storage device 150 in FIG. 1), such as a battery. To rotate the engine in reverse, an H-bridge circuit, such as that depicted at FIGS. 4A-4B, may be utilized. The unfueled cranking of the engine while the engine is spun in reverse is carried out at a predetermined set of conditions, the predetermined set of conditions including an engine speed, a duration of engine cranking, intake throttle position, and exhaust tuning valve position. The speed of the engine may be controlled via the motor, to the predetermined speed. In one example, the predetermined speed may be lower than 500 rpm. The predetermined engine conditions may comprise a set of conditions at which robust measurements of air flow may be obtained via the MAF sensor (such as MAF sensor 210 in FIG. 2) while the engine is being spun in reverse. In one example, the predetermined conditions may be calibrated by the controller prior to the initiation of the diagnostic routine based on the desired air flow via the MAF sensor. Even further, for rotating the engine unfueled in the reverse direction, valve timing may be controlled to default values.

While not explicitly shown, for vehicles equipped with exhaust gas recirculation (EGR) (e.g. high pressure EGR and/or low pressure EGR), one or more valve(s) controlling exhaust gas recirculation may be commanded or maintained closed.

At 708, the electric booster may be rotated in a reverse direction. The electric booster may be coupled to a conduit parallel to an intake passage, the conduit coupled to the intake passage downstream of an intake compressor and upstream of a charge air cooler. During conditions when the boost pressure provided by operating the turbocharger (such as intake compressor 114 and exhaust turbine 116 in FIG. 2) is lower than a desired boost pressure, the electric booster may be operated in a forward, default direction, to provide the desired boost. Reverse rotation of the electric booster creates a lower pressure at the exhaust manifold, thereby facilitating air flow through the exhaust system, the engine, and the intake manifold, in that order. The controller may send a signal to the electric booster actuator (such as actuator 155*b* in FIG. 1) to actuate the electric booster using energy from the energy storage device (such as energy storage device 250 in FIG. 1) coupled to the electric booster. The electric booster may be operated at a predetermined speed at which robust measurements of air flow may be obtained via the MAF sensor while the engine is being spun in reverse and the electric booster is rotated in reverse. In one example, the predetermined speed of rotation of the electric booster may be calibrated by the controller prior to the initiation of the diagnostic routine based on the desired air flow via the MAF sensor. During unfueled cranking of the engine, while the engine is spun in reverse and the electric booster is reverse rotated, a low pressure region is created within the exhaust manifold and ambient air may enter via the tailpipe and flow through the exhaust manifold, the engine cylinders, and the intake manifold (in that order) and then the air may escape to the atmosphere via the intake passage. In one example, step 708 of method 700 may be optional and diagnostics of the intake air filter may be carried out without spinning the electric booster. The electric booster may be maintained in a deactivated condition while the engine is reverse rotated to route ambient air into the exhaust manifold via the tailpipe during the intake air filter diagnostic routine.

At 710, the controller may retrieve a baseline air flow from an on-board database. In one example, the baseline air flow may be estimated via the MAF sensor upon installation of the air filter by cranking the engine unfueled in the reverse direction and rotating the electric booster in the reverse direction. In one example, installation of the air filter may include fitting the air filter in the engine at a manufacturing facility. In another example, installation of the air filter may include replacement of an older air filter with a new air filter at a service location. The baseline air flow may be estimated within a first threshold duration since installation of the intake air filter while the diagnostics of the air filter may be carried out when the intake air filter has been in use for over a second threshold duration, the second threshold duration being longer than the first threshold duration. In one example, the first threshold duration may be 1 day since the installation of the air filter. In another example, the second threshold duration may be 30 days since the installation of the air filter. Alternatively, the baseline air flow may be estimated within a first threshold distance of travel (of the vehicle) since installation of the intake air filter while the diagnostics of the air filter may be carried out when the intake air filter has been in use for over a second threshold distance of travel, the second threshold distance being longer than the first threshold distance. In one example, the first threshold distance may be 30 miles since the installation of the air filter. In another example, the second threshold distance may be 300 miles since the installation of the air filter.

The baseline air flow may be obtained while operating the engine and the electric booster at the predetermined set of conditions including an engine speed, a duration of engine cranking, intake throttle position, exhaust tuning valve position, and a speed of rotation of the electric booster. As an example, the predetermined set of conditions at which the baseline air flow is estimated is same as the predetermined set of conditions at which the engine is spun in step 706 and the electric booster is rotated in step 708.

In one example, the baseline air flow may be a single baseline air flow as estimated via the intake MAF sensor during engine operation at the predetermined set of conditions. In another example, there may be two separate baseline air flows, a first baseline intake air flow as estimated via the intake MAF sensor and a second baseline exhaust air flow as estimated via an exhaust differential pressure (dP) sensor coupled across an exhaust particulate filter. Each of the first baseline intake air flow and the second baseline exhaust air flow may be estimated during engine operation at the predetermined set of conditions. For a non-degraded engine system, since during reverse rotation of the engine (during non-combusting conditions), the same ambient air stream flows through each of the exhaust passage and the intake manifold, the air flow estimated by the dP sensor may be substantially equal to the air flow estimated by the MAF sensor. Therefore, the first baseline intake air flow and the second baseline exhaust air flow may be substantially equal to each other. In one example, substantially equal includes the first baseline intake air flow being within a threshold margin of the second baseline exhaust air flow. As an example, the threshold margin may be 5%. Also, the first baseline intake air flow may be equal to the second baseline exhaust air flow.

At 712, the method proceeds with the diagnostic routine for the intake air filter and estimates air flow through the intake system via the MAF sensor (intake air flow) and air flow through the exhaust system via the dP sensor (exhaust air flow). In the absence of a blockage or leak in the engine system, the same amount of air may flow through each of the exhaust manifold, the engine cylinders, and the intake manifold.

At 714, the method includes determining if there is a correlation between the intake air flow, the exhaust air flow, and the baseline air flow. In one example, the controller may determine if the intake air flow, the exhaust air flow, and the baseline air flow are substantially equal to one another. As described earlier, substantial equality may include each of the factors to be within a threshold margin of the other two factors, the factors being the intake air flow, the exhaust air flow, and the baseline air flow. In one example, the threshold margin may be 5%. In another example, it may be determined if the intake air flow, the exhaust air flow, and the baseline air flow are equal to each other.

In one example, if a separate intake baseline air flow and an exhaust baseline air flow is present, the controller may determine if the intake air flow, the exhaust air flow, the intake baseline air flow, and the exhaust baseline air flow are substantially equal to one another.

If it is determined that the there is a correlation between the intake air flow, the exhaust air flow, and the baseline air flow and that they are substantially equal to each other it may be inferred that the amount of ambient air flowing through the engine components at the time of the diagnostics is substantially equal to the amount of ambient air flowing through the engine components upon installation of the air filter. Therefore, it may be inferred that the air filter is not blocked and at 716, the controller may indicate that the air filter is not degraded. The controller may also indicate the intake air filter to be not degraded if the intake air flow, the exhaust air flow, the intake baseline air flow and the exhaust baseline air flow are substantially equal to one another. Also, since the intake air flow is substantially equal to the exhaust air flow, it may be inferred that there is no loss in air between the dP sensor and the MAF sensor as the ambient air flows through the engine components from the exhaust manifold to the intake manifold, thereby indicating that there is no leak or blockage in the engine components between dP sensor and the MAF sensor.

If it is determined that there is no correlation between the intake air flow, the exhaust air flow, and the baseline air flow, at 720, the routine includes determining if the intake air flow and the exhaust air flow are convergent but each of the intake air flow and the exhaust air flow are lower than the baseline air flow. In one example, the controller may determine if the intake air flow is substantially equal to the exhaust air flow but each of the intake air flow and the exhaust air flow are lower than the baseline air flow. In another example, the controller may determine if the intake air flow is substantially equal to the exhaust air flow but the intake air flow and the exhaust air flow are lower than the intake baseline air flow and the exhaust baseline air flow, respectively.

If it is determined that the intake air flow and the exhaust air flow are not convergent, at 721, it may be inferred that the intake air flow and the exhaust air flow are divergent. In one example, divergence between the intake air flow and the exhaust air flow may be inferred based on the intake air flow being substantially different from the exhaust air flow. As an example, the difference between the intake air flow and the exhaust air flow may be higher than 5%. The difference between the intake air flow and the exhaust air flow indicates that the entire volume of ambient air entering the engine system through the tailpipe flows through the exhaust manifold but the same volume of air may not flow through the intake manifold. Therefore, it may be inferred that there may be a leak in the engine system between the dP sensor housed in the exhaust manifold and the MAF sensor housed in the intake manifold and as air flows from the dP sensor to the MAF sensor, a portion of the air is lost from the flow path (between the dP sensor and the MAF sensor) through the leak. The controller may conduct further diagnostics of the engine system to identify the location of the leak. In one example, a leak in the intake manifold may be confirmed based on change in engine air fuel ratio as estimated via an oxygen sensor coupled to the exhaust passage upstream of the exhaust catalyst. If the presence of a leak is confirmed, the controller may adjust the air fuel ratio to compensate for the loss of air from the intake manifold. In one example, a leak in an evaporative emissions control system coupled to the engine intake manifold may result in air being routed to the EVAP system as it flows from the exhaust manifold to the intake manifold, thereby causing the intake air flow (as estimated via the MAF) to be lower than the exhaust air flow (as estimated via the dP). A canister purge valve (such as CPV 261 in FIG. 2) is housed in a canister purge line (such as purge line 228 in FIG. 2) of the EVAP system and a canister vent valve (such as CVV 297 in FIG. 2) is housed in a canister ventilation path (such as ventilation path 227 in FIG. 2) of the EVAP system. The canister purge line couples the intake system to a canister of the EVAP system and the canister ventilation path couples the canister to atmosphere, the canister purge line being coupled to the intake manifold downstream of the MAF sensor. A leak in the CPV may result in air flowing from the intake manifold to the canister via the purge line.

If at 720 it is determined that the intake air flow and the exhaust air flow are convergent but each of the intake air flow and the exhaust air flow are lower than the baseline air flow, it may be inferred that there is a blockage in the air flow. It may be determined that the intake air flow and the exhaust air flow are convergent but the intake air flow is lower than the intake baseline air flow and the exhaust air flow is lower than the baseline exhaust air flow. A secondary flow path for the air may be opened to determine the location of the blockage. The method continues to step A as elaborated in FIG. 7B.

At 722 (illustrated in FIG. 7B), method 700 includes opening the CPV and opening (or maintaining open) the CVV. The controller may send a signal to each of the actuators coupled to the CPV and the CVV to actuate each of the CPV and the CVV to an open position. As the CPV and the CVV are opened, a secondary path coupling the engine exhaust manifold to atmosphere may be established through the purge line and the ventilation path. In one example, if during the diagnostic routine, the CVV is already in an open position, the CVV may be maintained in the open position.

At 724, method 700 includes determining if upon opening of the secondary path to the atmosphere, the exhaust air flow increases to the baseline air flow. In one example, the controller may determine if upon opening of the secondary path to the atmosphere, the exhaust air flow increases to the baseline exhaust air flow. If the intake air filter is not blocked, such as upon installation of the air filter, due to lower pressure at the exhaust manifold (created by reverse rotation of engine and electric booster), a first amount of ambient air may enter the exhaust manifold and then flow to the atmosphere via the intake manifold (baseline air flow). However, if the intake air filter is blocked, the primary pathway for air entering the engine system through the exhaust passage (tailpipe) to escape to the atmosphere may be restricted, thereby reducing the air flow through the primary pathway relative to the baseline air flow. If an unrestricted secondary path to the atmosphere is opened, a higher amount of air may enter the exhaust manifold and flow to the atmosphere via the secondary path. As an example, if the purge line and the ventilation path of the EVAP system provide the secondary path, the first amount of ambient air may enter the exhaust manifold and then flow to the atmosphere via the purge line and the ventilation path of the EVAP system. As the purge line is coupled to the intake manifold downstream of the MAF sensor, the increase in air flow through the exhaust manifold may be detected by the dP sensor and may not be detected by the MAF sensor.

Therefore, if it is determined that upon opening the CPV and the CVV, the exhaust air flow increases to the baseline air flow (or the exhaust baseline air flow), it may be inferred that there is a restriction in the primary pathway. At 726, a diagnostic code (flag) may be set indicating blockage or degradation of the intake air filter.

Since the intake air filter is degraded, during a subsequent engine combusting condition, a lower than desired amount of air may flow into the intake manifold, thereby causing a richer than stoichiometric air-fuel mixture in the engine. During subsequent engine combusting conditions, in order to provide a desired air-fuel ratio for combustion, at 730, the throttle opening may be adjusted based on the filter blockage. In one example, until the blocked air filter is replaced, the controller may increase the opening of the intake throttle to compensate for the blockage in the intake air filter.

If at 724 it is determined that even after opening the CPV and the CVV, the exhaust air flow does not increase to the baseline air flow (or to the exhaust baseline air flow), it may be inferred that there may be a blockage in the exhaust system or the intake system of the engine at a location other than the intake air filter. Due to the blockage, even upon opening a second path to atmosphere, a lower amount of air (relative to the amount of air flowing through the engine upon installation of the air filter) may flow through the engine components. In one example, the blockage may include foreign objects in the muffler or a degraded exhaust after treatment device. At 732, the possible blockage may be indicated by setting a diagnostic code and the controller may conduct further diagnostics of the engine system to identify the location of the blockage. In one example, if a catalyst monitor sensor (oxygen sensor) does not alternate between rich and lean, it may be inferred that the exhaust catalyst is plugged. Clogging in the exhaust catalyst may be reduced fuel economy and increased occurrences of misfires.

In this way, it may be indicated that the air filter is blocked responsive to an increase in the exhaust air flow following the opening of the CPV and the CVV and that the air filter is not blocked responsive to the exhaust air flow not changing following the opening of the CPV and the CVV.

At 718, the diagnostic routine is completed and each of the engine and the electric booster may no longer be rotated. The controller may send a signal to the motor powering the engine to stop rotating the engine. The controller may also send a signal to the actuator coupled to the electric booster to suspend operation of the electric booster.

In this way, during a first engine condition, the engine may be reverse rotated, unfueled, and a first baseline intake air flow and a second baseline exhaust air flow may be recorded, the first engine condition including an engine condition when a lower than first threshold duration has elapsed since installation of the intake air filter. During a second engine condition, the engine may be reverse rotated, unfueled, and an updated intake air flow and an updated exhaust air flow may be recorded, and a presence or an absence of degradation of an intake air filter may be diagnosed based on a correlation amongst each of the first baseline intake air flow, the second baseline exhaust air flow, the updated intake air flow, and the updated exhaust air flow to one another. The second engine condition including a used engine condition when the intake air filter has been in use for over a second threshold duration, the second threshold duration longer than the first threshold duration.

FIG. 8 shows an example timeline 800 illustrating diagnostics of an intake air filter (such as air filter 215 in FIG. 2). The horizontal (x-axis) denotes time and the vertical markers t1-t6 identify significant times in the routine for diagnostics of the intake air filter.

The first plot, line 802, shows variation in vehicle speed over time. The second plot, line 804, shows a direction of rotation of the engine. The engine may be rotated in a forward, default, direction, for example during engine operation with air fuel combustion in the engine cylinders, the fuel being supplied to the engine cylinders via fuel injectors. Alternatively, the engine may be rotated in a reverse direction, unfueled, such as via an electric machine coupled to the hybrid electric vehicle (HEV) or via the starter motor. The third plot, line 806, shows a direction of rotation of an electric booster (such as electric booster 155 in FIG. 1) coupled to a conduit parallel to the intake manifold downstream of an intake compressor and upstream of a charge air cooler (CAC). The electric booster may be rotated in a forward direction or a reverse direction by reversing a circuit of an actuator coupled to the electric booster, the electric booster powered via an onboard energy storage device. The forward direction of rotation of the electric booster is opposite to the reverse direction of rotation of the electric booster. The fourth plot, line 808, shows operation of the electric machine coupled to the hybrid electric vehicle (HEV). The machine may be operated to provide motor torque to propel the HEV. The fifth plot, line 811, shows the reading of a differential pressure sensor (such as dP sensor 263 in FIG. 2) coupled across a particulate filter housed in the exhaust passage. During diagnostics of the intake air filter, the dP sensor reading corresponds to the exhaust air flow. The sixth plot, line 814, shows the reading of a MAF sensor (such as MAF sensor 210 in FIG. 2) coupled to the intake manifold. During diagnostics of the intake air filter, the MAF sensor reading corresponds to the intake air flow. The seventh plot, line 818, shows opening of a canister purge valve (CPV) coupled to a canister purge line of an evaporative emissions control system. The canister purge line coupled the intake passage (from downstream of the MAF sensor) to a canister of the EVAP system. Further, a canister ventilation path housing a canister vent valve (CVV) couples the canister to atmosphere. If each of the CPV and the CVV are opened, a flow path between the intake manifold and the atmosphere is established through the canister purge line and the canister ventilation path. The eighth plot, dashed line 820, shows a flag denoting a diagnostic code set to indicate a degraded exhaust tuning valve.

Prior to time t0, a new (unused) intake air filter is installed in the intake manifold of the vehicle at a manufacturing facility. Upon installation of the air filter, between time t0 and t1 when the vehicle is not propelled via engine torque or motor torque and optionally upon confirmation that the vehicle is unoccupied based on input from on-board cameras, a baseline air flow is estimated. At time t1, the controller sends a signal to the HEV machine to spin the engine unfueled in a reverse direction at a first engine speed. Also, the controller sends a signal to the actuator coupled to the electric booster to rotate the electric booster in a reverse direction at a first electric booster speed. As the engine and the electric booster are rotated in their respective reverse directions, a lower pressure is created at the engine exhaust manifold and ambient air enters the engine system via the exhaust passage. The ambient air then flows through the engine cylinders, the intake manifold, and is then routed to the atmosphere via the intake passage. During measurement of the baseline air flow, the CPV valve is maintained in the closed position. Between time t0 and t1, the intake air flow as estimated via the MAF sensor, as shown by line 810, is saved in on-board database as the baseline air flow corresponding to an unused (not-blocked) air filter. This baseline air flow 810 is later used during diagnostics of the intake air filter. Since the intake air filter is not indicated as being degraded, the flag is maintained in an off position.

At time t1, once the baseline air flow is saved in memory, the controller sends a signal to each of the HEV machine and the electric booster actuator to suspend operation and to stop rotating the engine and the electric booster, respectively (for the purposes of the diagnostic routine). The time duration between time t1 and t2 corresponds to a threshold duration after which a diagnostic routine for the intake air filter is desired to be carried out opportunistically. The duration between time t1 and t2 includes a plurality of drive cycles and periods of time when the vehicle is not operated (not propelled via engine torque or machine torque).

At time t2, the vehicle starts from rest and is operated via engine torque. The engine is driven by combustion and is rotated in the forward direction. Based on the torque demand, the electric booster is rotated in a forward direction to provide the desired boost pressure. The HEV machine is not operated for engine rotation or vehicle propulsion. Between time t2 and t3, the MAF reading denotes the amount of air entering the engine, via the intake passage, for combustion. The amount of air entering the intake passage is proportional to the throttle opening. The dP sensor reading correspond to the soot load accumulated on the particulate filter across which the dP sensor is coupled. Between t2 and t3, the particulate filter is regenerated. During regeneration of the particulate filter, heat from the exhaust burns the soot deposited on the particulate filter and as the soot load on the particulate filter decreases, a corresponding decrease in the differential pressure across the particulate filter is observed.

At time t3, the vehicle speed reduces to zero and between time t3 and t4, the vehicle is no longer operated using engine torque and/or machine torque (vehicle key-off condition begins). Therefore, at time t3, the engine is shut-down by suspending fuel injection and spark to the engine cylinders. Also, operation of the electric booster is suspended. Between time t3 and t4, the engine is maintained in the off condition.

At time t4, after a threshold duration has elapsed since the vehicle key-off at time t3 and optionally upon confirmation that the vehicle is unoccupied based on input from on-board cameras, diagnostics of the intake air filter is initiated by waking up the controller. The controller sends a signal to the HEV machine to spin the engine unfueled in a reverse direction at the first engine speed. Also, the controller sends a signal to the actuator coupled to the electric booster to rotate the electric booster in a reverse direction at a first electric booster speed. As the engine and the electric booster are rotated in their respective reverse directions, a lower pressure is created at the engine exhaust manifold and ambient air may enter the engine system via the exhaust passage. Between time t4 and t5 ambient air flows through the exhaust manifold, the engine cylinders, and the intake manifold, in that order. The baseline air flow 813, as estimated between time t0 and t1 is retrieved from the on-board database and compared to each of the intake air flow as estimated based on the MAF reading, and the exhaust air flow as estimated based on the dP sensor reading.

Between time t4 and t5, it is observed that the intake air flow is equal to the exhaust air flow but each of the intake air flow and the exhaust air flow are lower than the baseline air flow 813. Therefore, it is inferred that an equal amount of air is flowing through the exhaust manifold and the intake manifold but due to a blockage in the engine system, the amount of air entering the engine system is lower during this time compared to the amount of air entering the engine (between time t0 and t1) upon installation of the intake air filter.

At time t5, the controller sends a signal to the CPV to actuate the valve to an open position. Also the CVV is maintained in an open position to establish fluidic communication between the intake manifold and the atmosphere via the canister purge line and the canister ventilation path. Upon opening of the CPV, between time t5 and t6, it is observed that there is an increase in the dP sensor reading without any significant change (more than 5% change) in the MAF sensor reading. The increased exhaust air flow is equal to the baseline air flow 813. Based on the increase in the exhaust air flow to the baseline air flow, it is inferred that there is blockage in the intake air filter and as the unobstructed flow path to atmosphere via the canister purge line and the canister ventilation path is opened, there is an increase in air flow entering the exhaust manifold.

In response to the detection of blockage in the intake air filter, the flag is set after time t5 to notify the operator. At time t6, at the end of the diagnostic routine, the controller sends a signal to each of the HEV machine and the electric booster actuator to suspend operation and to stop rotating the engine and the electric booster, respectively. Also, the CPV is actuated to the closed position to seal the EVAP system. After time t6, the vehicle is not propelled using engine torque and/or machine torque and the engine is maintained in the shut-down condition until a subsequent vehicle key-on. The flag indicating the intake air filter blockage (degradation) is maintained until the air filter is replaced or serviced.

In this way, existing engine components such as the differential pressure sensor and the MAF sensor may be repurposed as an exhaust air flow meter and intake flow meter, respectively, for the diagnostics of the intake air filter. The technical effect of confirming blockage in the intake air filter by opening a secondary path to atmosphere via the EVAP system is that a blockage in the intake air filter may be differentiated from blockage in other intake and exhaust component such as an exhaust catalyst. By detecting degradation of the intake air filter, a desired air-fuel ratio may be regulated and combustion of richer air-fuel mixture may be reduced. Overall, by opportunistically monitoring the health of the intake air filter, degradation of the air filter may be detected in a timely manner and the blocked intake air filter may be replaced shortly.

An example engine method comprises: during unfueled cranking of an engine while the engine is spun in reverse, indicating a blocked intake air filter based on air flow through an exhaust system relative to air flow through an intake system and further based on a change in the air flow through the exhaust system upon opening a secondary path to atmosphere. In any preceding example, additionally or optionally, indicating a blocked intake air filter based on air flow through the exhaust system relative to air flow through the intake system includes: comparing air flow through the exhaust system and air flow through the intake system to each other and to a baseline air flow, in response to the air flow through the exhaust system being substantially equal to the air flow through the intake system and each of the air flow through the exhaust system and the air flow through the intake system being lower than the baseline air flow, indicating an air flow blockage, and indicating that the air flow blockage is the blocked intake air filter based on the change in the air flow through the exhaust system upon opening the secondary path to atmosphere. In any or all of the preceding examples, additionally or optionally, air flow through the exhaust system is estimated via a differential pressure (dP) sensor coupled across a particulate filter housed in an exhaust passage and air flow through the intake system is estimated via a manifold air flow (MAF) sensor coupled to an intake manifold. In any or all of the preceding examples, additionally or optionally, indicating the air flow blockage is the blocked air filter based on the change in the air flow through the exhaust system upon opening the secondary path to atmosphere includes indicating the air flow blockage is the blocked air filter responsive to an increase in the air flow through the exhaust system upon opening each of a compressor purge valve (CPV) and a compressor vent valve (CVV) of an evaporative emissions control (EVAP) system. In any or all of the preceding examples, additionally or optionally, the CPV is housed in a canister purge line of the EVAP system and the CVV is housed in a canister ventilation path of the EVAP system, the canister purge line coupling the intake system to a canister of the EVAP system and the canister ventilation path coupling the canister to atmosphere and wherein the canister purge line is coupled to the intake manifold downstream of the MAF sensor. In any or all of the preceding examples, the method further comprises, additionally or optionally, indicating that the air flow blockage is a blockage in the exhaust system responsive to the change in the air flow through the exhaust system upon opening the secondary path to atmosphere being less than a threshold change responsive to opening each of the CPV and the CVV. In any or all of the preceding examples, the method further comprises, additionally or optionally, indicating a leak in at least one of the intake system and the exhaust system responsive to the air flow through the exhaust system being substantially different from the air flow through the intake system, wherein the leak is upstream of the dP sensor. In any or all of the preceding examples, the method further comprises, additionally or optionally, while the engine is spun in reverse, operating an intake electric booster in a reverse direction to route ambient air from an engine exhaust passage to the engine intake manifold via one or more engine cylinders. In any or all of the preceding examples, additionally or optionally, the unfueled cranking of the engine while the engine is spun in reverse is carried out at a predetermined set of conditions, the predetermined set of conditions including an engine speed, a duration of engine cranking, intake throttle position, electric booster speed, and exhaust tuning valve position. In any or all of the preceding examples, additionally or optionally, the baseline air flow is estimated via the MAF sensor upon installation of the air filter by cranking the engine unfueled in the reverse direction at the predetermined set of conditions. In any or all of the preceding examples, additionally or optionally, the engine is coupled in a vehicle and the reverse rotation of the engine is conducted via a motor powered by a battery under conditions where the vehicle is not occupied and the vehicle is not in motion. In any or all of the preceding examples, the method further comprises, additionally or optionally, in response to the detection of the blocked intake air filter, setting a diagnostics code, and adjusting an opening of an intake throttle to compensate for blockage in the intake air filter.

Another engine example method for an autonomous vehicle comprises: during a first engine condition when the vehicle is operated without a human driver and when the vehicle is not being propelled by engine torque, reverse rotating an engine, unfueled, and recording a first baseline intake air flow and a second baseline exhaust air flow, during a second engine condition when the vehicle is operated without a human driver and when the vehicle is not being propelled by engine torque, reverse rotating the engine, unfueled, and recording an updated intake air flow and an updated exhaust air flow, and diagnosing a presence or an absence of degradation of an intake air filter based on a correlation amongst each of the first baseline intake air flow, the second baseline exhaust air flow, the updated intake air flow, and the updated exhaust air flow. In any preceding example, additionally or optionally, the first engine condition includes an engine condition when a lower than first threshold duration has elapsed since installation of the intake air filter, and the second engine condition includes a used engine condition when the intake air filter has been in use for over a second threshold duration, the second threshold duration longer than the first threshold duration. In any or all of the preceding examples, additionally or optionally, diagnosing the presence of degradation of the intake air filter is based on the updated intake air flow being substantially equal to the updated exhaust air flow, the updated intake air flow being lower than the first baseline intake air flow, and the updated exhaust air flow being lower than the first baseline exhaust air flow, and the presence of degradation of the intake air filter bring further based on an increase in the updated exhaust air flow upon opening an air flow path from downstream of the MAF sensor to atmosphere. In any or all of the preceding examples, additionally or optionally, the air flow path from downstream of the MAF sensor to atmosphere is via a canister purge line, a canister, and a canister ventilation path of an evaporative emissions system, and wherein the air flow path is opened by actuating each of a canister purge valve coupled to the canister purge line to an open position and a canister vent valve coupled to the canister ventilation path to an open position. In any or all of the preceding examples, additionally or optionally, diagnosing the absence of degradation of the intake air filter is based on the updated intake air flow being substantially equal to the updated exhaust air flow, the updated intake air flow being substantially equal to the first baseline intake air flow, and the updated exhaust air flow being substantially equal to the first baseline exhaust air flow.

In yet another example, a hybrid vehicle system comprises: a vehicle, an engine, an electric machine coupled to a battery capable of rotating the engine, an intake passage including an intake air filter and a compressor, an exhaust passage including a particulate filter, a manifold air flow (MAF) sensor coupled to the intake passage, a differential pressure sensor coupled across the particulate filter, a canister purge line and a ventilation path coupling the intake passage to atmosphere via a canister, the canister purge line including a canister purge valve (CPV) and the ventilation path including a canister vent valve (CVV). The hybrid vehicle further comprising a controller with computer readable instructions stored on non-transitory memory for: obtaining a baseline air flow via the MAF sensor by reverse rotating the engine with the electric machine when the intake air filter is first installed; and after usage of the intake air filter for a threshold duration since the intake air filter is installed and while the engine is rotated in reverse by the electric machine, obtaining a first intake air flow via the MAF sensor and a first exhaust air flow via the differential pressure sensor, comparing the first intake air flow, the first exhaust air flow, and the baseline air flow, and in response to the first intake air flow and the first exhaust air flow being equal to one another and being lower than the baseline air flow, diagnosing the intake air filter responsive to a change in the first exhaust air flow following opening of the CPV and the CVV. In any preceding example, additionally or optionally, diagnosing the intake air filter responsive to the change in the first exhaust air flow includes one of indicating the air filter is blocked responsive to an increase in the first exhaust air flow following the opening of the CPV and the CVV and indicating the air filter is not blocked responsive to the first exhaust air flow not changing following the opening of the CPV and the CVV. In any or all of the preceding examples, additionally or optionally, obtaining each of the baseline air flow, the first intake air flow, and the first exhaust air flow are measured for a threshold duration at an engine idling speed when the vehicle is not occupied and the vehicle is not being propelled.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   during unfueled cranking of an engine while the engine is spun in reverse, indicating a blocked intake air filter based on air flow through an exhaust system relative to air flow through an intake system and further based on a change in the air flow through the exhaust system upon opening a secondary path to atmosphere.

2. The method of claim 1, wherein indicating a blocked intake air filter based on air flow through the exhaust system relative to air flow through the intake system includes:
   comparing air flow through the exhaust system and air flow through the intake system to each other and to a baseline air flow;
   in response to the air flow through the exhaust system being substantially equal to the air flow through the intake system and each of the air flow through the exhaust system and the air flow through the intake system being lower than the baseline air flow, indicating an air flow blockage; and
   indicating that the air flow blockage is the blocked intake air filter based on the change in the air flow through the exhaust system upon opening the secondary path to atmosphere.

3. The method of claim 2, wherein air flow through the exhaust system is estimated via a differential pressure (dP) sensor coupled across a particulate filter housed in an exhaust passage and air flow through the intake system is estimated via a manifold air flow (MAF) sensor coupled to an intake manifold.

4. The method of claim 3, further comprising, indicating a leak in at least one of the intake system and the exhaust system responsive to the air flow through the exhaust system being substantially different from the air flow through the intake system, wherein the leak is upstream of the dP sensor.

5. The method of claim 3, wherein the unfueled cranking of the engine while the engine is spun in reverse is carried out at a predetermined set of conditions, the predetermined set of conditions including an engine speed, a duration of engine cranking, intake throttle position, electric booster speed, and exhaust tuning valve position.

6. The method of claim 5, wherein the baseline air flow is estimated via the MAF sensor upon installation of the air filter by cranking the engine unfueled in the reverse direction at the predetermined set of conditions.

7. The method of claim 2, wherein indicating the air flow blockage is the blocked air filter based on the change in the air flow through the exhaust system upon opening the secondary path to atmosphere includes indicating the air flow blockage is the blocked air filter responsive to an increase in the air flow through the exhaust system upon opening each of a compressor purge valve (CPV) and a compressor vent valve (CVV) of an evaporative emissions control (EVAP) system.

8. The method of claim 7, wherein the CPV is housed in a canister purge line of the EVAP system and the CVV is housed in a canister ventilation path of the EVAP system, the canister purge line coupling the intake system to a canister of the EVAP system and the canister ventilation path coupling the canister to atmosphere and wherein the canister purge line is coupled to the intake manifold downstream of the MAF sensor.

9. The method of claim 7, further comprising, indicating that the air flow blockage is a blockage in the exhaust system responsive to the change in the air flow through the exhaust system upon opening the secondary path to atmosphere being less than a threshold change responsive to opening each of the CPV and the CVV.

10. The method of claim 1, further comprising, while the engine is spun in reverse, operating an intake electric booster in a reverse direction to route ambient air from an engine exhaust passage to the engine intake manifold via one or more engine cylinders.

11. The method of claim 1, wherein the engine is coupled in a vehicle and the reverse rotation of the engine is conducted via a motor powered by a battery under conditions where the vehicle is not occupied and the vehicle is not in motion.

12. The method of claim 1, further comprising, in response to the detection of the blocked intake air filter, setting a diagnostics code, and adjusting an opening of an intake throttle to compensate for blockage in the intake air filter.

13. An engine method for an autonomous vehicle, comprising:
   during a first engine condition when the vehicle is operated without a human driver and when the vehicle is not being propelled by engine torque, reverse rotating an engine, unfueled, and recording a first baseline intake air flow and a second baseline exhaust air flow;
   during a second engine condition, when the vehicle is operated without a human driver and when the vehicle is not being propelled by engine torque, reverse rotating the engine, unfueled, and recording an updated intake air flow and an updated exhaust air flow; and
   diagnosing a presence or an absence of degradation of an intake air filter based on a correlation amongst each of the first baseline intake air flow, the second baseline exhaust air flow, the updated intake air flow, and the updated exhaust air flow.

14. The method of claim 13, wherein the first engine condition includes an engine condition when a lower than first threshold duration has elapsed since installation of the intake air filter, and the second engine condition includes a used engine condition when the intake air filter has been in use for over a second threshold duration, the second threshold duration longer than the first threshold duration.

15. The method of 13, wherein diagnosing the presence of degradation of the intake air filter is based on the updated intake air flow being substantially equal to the updated exhaust air flow, the updated intake air flow being lower than the first baseline intake air flow, and the updated exhaust air flow being lower than the first baseline exhaust air flow, and the presence of degradation of the intake air filter bring further based on an increase in the updated exhaust air flow upon opening an air flow path from downstream of the MAF sensor to atmosphere.

16. The method of claim 15, wherein the air flow path from downstream of the MAF sensor to atmosphere is via a canister purge line, a canister, and a canister ventilation path of an evaporative emissions system, and wherein the air flow path is opened by actuating each of a canister purge valve coupled to the canister purge line to an open position and a canister vent valve coupled to the canister ventilation path to an open position.

17. The method of claim 13, wherein diagnosing the absence of degradation of the intake air filter is based on the updated intake air flow being substantially equal to the updated exhaust air flow, the updated intake air flow being substantially equal to the first baseline intake air flow, and the updated exhaust air flow being substantially equal to the first baseline exhaust air flow.

18. A hybrid vehicle system, comprising:
 a vehicle;
 an engine;
 an electric machine coupled to a battery capable of rotating the engine;
 an intake passage including an intake air filter and a compressor;
 an exhaust passage including a particulate filter;
 a manifold air flow (MAF) sensor coupled to the intake passage;
 a differential pressure sensor coupled across the particulate filter;
 a canister purge line and a ventilation path coupling the intake passage to atmosphere via a canister, the canister purge line including a canister purge valve (CPV) and the ventilation path including a canister vent valve (CVV); and
 a controller with computer readable instructions stored on non-transitory memory for:
  obtaining a baseline air flow via the MAF sensor by reverse rotating the engine with the electric machine when the intake air filter is first installed; and
  after usage of the intake air filter for a threshold duration since the intake air filter is installed and while the engine is rotated in reverse by the electric machine,
  obtaining a first intake air flow via the MAF sensor and a first exhaust air flow via the differential pressure sensor,
  comparing the first intake air flow, the first exhaust air flow, and the baseline air flow; and
  in response to the first intake air flow and the first exhaust air flow being equal to one another and being lower than the baseline air flow, diagnosing the intake air filter responsive to a change in the first exhaust air flow following opening of the CPV and the CVV.

19. The system of claim 18, wherein diagnosing the intake air filter responsive to the change in the first exhaust air flow includes one of indicating the air filter is blocked responsive to an increase in the first exhaust air flow following the opening of the CPV and the CVV and indicating the air filter is not blocked responsive to the first exhaust air flow not changing following the opening of the CPV and the CVV.

20. The system of claim 18, wherein obtaining each of the baseline air flow, the first intake air flow, and the first exhaust air flow are measured for a threshold duration at an engine idling speed when the vehicle is not occupied and the vehicle is not being propelled.

\* \* \* \* \*